(12) United States Patent
Kulat

(10) Patent No.: US 12,433,366 B2
(45) Date of Patent: Oct. 7, 2025

(54) SHOE HAVING TOE SEPARATING ELEMENTS

(71) Applicant: Kevin James Kulat, Downers Grove, IL (US)

(72) Inventor: Kevin James Kulat, Downers Grove, IL (US)

(73) Assignee: Kevin James Kulat, New York, NY (US)

( * ) Notice: Subject to any disclaimer, the term of this patent is extended or adjusted under 35 U.S.C. 154(b) by 0 days.

(21) Appl. No.: 18/412,524

(22) Filed: Jan. 13, 2024

(65) Prior Publication Data

US 2024/0237780 A1 Jul. 18, 2024

Related U.S. Application Data

(60) Provisional application No. 63/594,494, filed on Oct. 31, 2023, provisional application No. 63/516,429, filed on Jul. 28, 2023, provisional application No. 63/511,505, filed on Jun. 30, 2023, provisional application No. 63/453,085, filed on Mar. 18, 2023, provisional application No. 63/439,105, filed on Jan. 14, 2023.

(51) Int. Cl.
| | |
|---|---|
| A43B 7/26 | (2006.01) |
| A43B 7/1425 | (2022.01) |
| A43B 7/16 | (2006.01) |
| A43B 13/14 | (2006.01) |
| B33Y 80/00 | (2015.01) |

(52) U.S. Cl.
CPC .............. *A43B 7/26* (2013.01); *A43B 7/1425* (2013.01); *A43B 7/16* (2013.01); *A43B 13/14* (2013.01); *A43B 13/145* (2013.01); *B33Y 80/00* (2014.12)

(58) Field of Classification Search
CPC .. A43B 7/26; A43B 7/16; A43B 7/145; A43B 7/1425; A43B 7/144
See application file for complete search history.

(56) References Cited

U.S. PATENT DOCUMENTS

| | | | | |
|---|---|---|---|---|
| 1,730,466 A | * | 10/1929 | Mallott | A43B 7/145 36/44 |
| 1,841,942 A | * | 1/1932 | Fenton | A43B 7/14 36/145 |
| 2,569,721 A | * | 10/1951 | Juers | A43B 7/1425 36/145 |
| 4,109,661 A | * | 8/1978 | Fukuoka | A43B 7/145 36/141 |
| 4,760,655 A | * | 8/1988 | Mauch | A43B 7/146 36/43 |
| 4,803,989 A | * | 2/1989 | Collins | A43B 7/1445 36/154 |
| 5,784,811 A | * | 7/1998 | Mauch | A43B 7/1425 36/43 |
| 5,893,221 A | * | 4/1999 | Weissman | A43B 13/148 36/169 |

(Continued)

*Primary Examiner* — Katharine G Kane

(57) ABSTRACT

A sole for a shoe or footwear device having one or more of a laterally and/or medially flared forefoot portion, a spherical protrusion underneath, and discrete toe separating elements between at least one pair of adjacent toes. A shoe may be formed from said sole by joining said sole with an upper. A method of custom-fitting such a sole, shoe, or other footwear device to the foot or feet of a unique wearer is also disclosed.

15 Claims, 17 Drawing Sheets

(56) References Cited

U.S. PATENT DOCUMENTS

| | | | | |
|---|---|---|---|---|
| 8,991,075 B2* | 3/2015 | Chenciner | A43B 3/0036 |
| | | | | 36/8.1 |
| 2008/0216353 A1* | 9/2008 | Langvin | A43B 13/187 |
| | | | | 36/44 |
| 2009/0126225 A1* | 5/2009 | Jarvis | B33Y 10/00 |
| | | | | 12/146 B |
| 2009/0188129 A1* | 7/2009 | Fusco | A43B 7/144 |
| | | | | 36/44 |
| 2009/0205222 A1* | 8/2009 | McLinden | A43B 17/02 |
| | | | | 36/28 |
| 2009/0217552 A1* | 9/2009 | Paintin | A43B 11/00 |
| | | | | 36/138 |
| 2012/0102786 A1* | 5/2012 | True | A43B 5/025 |
| | | | | 36/114 |
| 2015/0165690 A1* | 6/2015 | Tow | B33Y 10/00 |
| | | | | 700/119 |
| 2016/0374431 A1* | 12/2016 | Tow | A43D 1/022 |
| | | | | 36/43 |
| 2017/0105479 A1* | 4/2017 | Usherwood | A43B 7/1435 |
| 2021/0259359 A1* | 8/2021 | Maselino | A43B 7/1435 |
| 2022/0039517 A1* | 2/2022 | Kang | A43B 7/1475 |
| 2022/0338595 A1* | 10/2022 | Gilmore | A43B 17/00 |
| 2023/0210214 A1* | 7/2023 | Wills, III | A43B 5/06 |
| | | | | 36/102 |
| 2023/0270207 A1* | 8/2023 | Stauffer | A43B 7/1445 |
| | | | | 36/28 |

* cited by examiner

SHOE HAVING TOE SEPARATING ELEMENTS

CROSS-REFERENCE TO RELATED APPLICATIONS

This application claims the benefit of U.S. Provisional Applications Nos. 63/439,105, 63/435,085, 63/511,505, 63/516,429, and 63/594,494.

BACKGROUND

Shoes and sandals as they generally exist today all have roughly the same sole shape—tapered to match the curves of the whole foot, but ultimately pill-shaped. From a circular heel cup extend lateral edges, which then smoothly transition into a fundamentally circularly curved or pointed forefoot portion. This sole shape and accompanying upper shape accommodates the tarsal and metatarsal bones largely without issue, as these bones only twist very short distances and angles relative to each other in the process of balancing the body and applying force. The phalanges, however, are not such subtle structures. At the metatarsophalangeal joint, or toe knuckle, the first phalanx has a flexion range of motion of 30 degrees and an extension range of motion of 80 degrees. At the interphalangeal joint, or middle toe knuckle, both flexion and extension have a range of motion of 50 degrees. These are far more dynamic musculoskeletal structures than the remainder of the foot—to force upon them the same static structure that houses the remainder of the foot guarantees negative consequences.

The most commonly known negative consequence is hallux valgus, or bunions. This lateral deformity of the big toe arises from too-frequent wearing of too-constrictive footwear, causes great pain for the patient, and is very stubbornly inelastic. Attempts of all sorts have been made at correcting this problem, from a toe separator between the big toe and index toe to outright surgery. Yet every solution so far neglects the basic mathematics of the problem.

The baseline structure of the toe is that of rigid, inelastic bones connected via stiff yet ultimately malleable ligaments. Hallux valgus is well understood to be not a deformity of the bones themselves, but a mal-orientation of the bones relative to each other. Thus, the mathematics of this problem is the mathematics of the ligaments. At the opposite end of the body is another well-understood representation of the mathematics of the ligaments: the human jaw and teeth. The teeth are connected to the jaw via the periodontal ligaments, yet oftentimes not in the exact correct shape. To fix this, braces, Invisalign, and the like apply external force incrementally to slowly force the ligaments into correctly aligning the teeth over the course of roughly 12 months.

By combining the concept of braces with the concept of hallux valgus, we arrive at one common baseline mathematics of the ligaments: mal-orientation of the connected bones which may seem and feel inelastic, but can in fact be corrected over time in tiny increments. Furthermore, although hallux valgus is the representative ailment for ligamental mal-orientation of the phalanges, all five toes have this same baseline bone-ligament structure, and can thus be healed according to the same mathematics and methods.

The footwear presented takes the concept of braces for teeth and inverts it. Instead of applying an external forcing function, if the phalangeal structures are subjected to the exact opposite of an external forcing function—completely free range of motion, physical infinity—the tendons and muscles surrounding the bones and ligaments will act as internal forcing functions to bring the toes back into correct alignment with the foot naturally over time. Alternatively, substantial toe separators integrated with footwear itself may achieve the same end.

SUMMARY OF THE INVENTION

Presented is footwear and elements of footwear for human feet which enable all five toes to laterally and medially articulate and expand to their fullest breadth and articular fidelity. It is known and understood that the examples presented are non-limitative, and that the elements disclosed herein may be combined with each other in all permutations and combinations. Furthermore, the elements and concepts disclosed herein may be manufactured using methods other than the methods disclosed herein to produce a final product.

In one aspect, the aim of toe separation may be achieved by a forefoot portion flared or expanded outwardly at the first and fifth metatarsophalangeal joints (henceforth referred to as toe knuckles). In another aspect, this may be achieved by a spherical protrusion below the toe knuckle system. In another aspect, this may be achieved by at least one toe separator occurring between at least one pair of adjacent toes.

The most basic form of the sole portion of the invention is a flat sole flared outwardly at the first and fifth toe knuckles. Upon this concept is built a more advanced sole having a protrusion underneath the entire toe knuckle system, wherein at least the portion of the protrusion which interfaces with the toe knuckles is as a spherical contour— i.e. all points are equidistant from a common radius, which may or may not be located within the volume of the manufactured body.

This sole may further comprise a thickened heel portion to compensate for the added height of this spherical profile. The thickened heel portion may be flared vertically from the original size and shape on top to an expanded profile of the same shape on the bottom for stability and comfort.

Said outwardly flared or expanded sole, potentially further comprising a substantial spherical protrusion below the toe knuckles, may further comprise at least one physical toe separating element situated between at least one pair of adjacent toes. Said physical toe separating element or elements may further comprise an expanded distal end which enables said toe spacers to secure the shoe or other footwear device to the foot of the wearer, or to meaningfully contribute to the securing of the shoe or other footwear device to the foot of the wearer as one part of a multi-part system of securing features. Said physical toe separating elements may be as integral portions of said sole, or as insertable and removable external bodies.

Upon this basic sole is then formed a complete shoe or other footwear device. In the realm of traditional manufacturing, this means fastening an upper to the sole via stitching, gluing, or any other standard method. Here is presented a non-traditional embodiment intended for monolithic construction via 3D printing. This choice of manufacturing method makes possible further advancements in shoe technology: relatively simple customization of a unique shoe or pair of shoes to a unique wearer's foot or pair of feet, and unique lattice structures with which to construct an upper or a sole.

To complete the picture of producing such footwear for real people, we must include the ability to accommodate feet of a wide range of shapes and sizes. Although the disclosed invention may be manufactured using methods other than 3D printing, and although the choice of 3D printing as a manufacturing method does not preclude the use of the standardized discrete shoe sizing systems of today, 3D printing makes possible a simple process of crafting a unique shoe or other footwear device for a unique person's unique foot or feet based on a characterizing scan of said foot or feet. This scan may be as an electronic scan via electronic scanner imported into a computer aided drafting program, or as a trace on paper with a pen, pencil, or other standard writing instruments as well as a ruler. For the tarsal-metatarsal portion of the foot, a simple scan or trace suffices to define the outer perimeter of the foot which will be emulated in shape by the shoe or other footwear device. For the toes and toe knuckles, the extensor digitorum longus and extensor hallucis longus tendons bulge in straight lines under the skin when activated; upon such bulges corresponding to the big toe and pinky toe are superimposed straight reference lines. The lateral sides of the forefoot portion, or toe box, are flared out to be parallel with those lines, with said flares beginning at the hind-most sides of the pinky toe knuckle and big toe knuckle. Optionally, they may be flared outwardly at a wider angle, and/or flared in two stages with one flare beginning at the side of the toe knuckle closest to the heel and another flare beginning at the side of the toe knuckle farthest from the heel. The foremost portion of the sole is drawn as an arc beyond the distal ends of all five toes.

If the sole further comprises a spherical protrusion within the forefoot portion, the curvature of the foot may be further characterized to determine an ideal characteristic radius for this spherical protrusion, as well as an ideal height and inferior base area for a potential accompanying raised heel portion. Such curvature may include, but is not limited to: concavity of the plantar arch; convexity of the dorsal portion of the foot; angle formed by extensor hallucis longus tendon reference line and pinky toe extensor digitorum reference line; concavity of the inferior sides of the five toe knuckles when taken as a system; concavity of the superior sides of the five toe knuckles when taken as a system.

If the sole further comprises toe separating elements, the gaps between the toe or toes intended to receive said toe separating element or elements may be characterized to determine the ideal size, shape, location, and any other defining characteristic for said toe separating element or elements.

Over time, by wearing the disclosed footwear devices, the wearer's toes may spread out wider, necessitating a new scan to correctly define the curvature of the foot. As such, a shoe or other footwear device which could originally be said to have a "perfect fit" may no longer fit as optimally, necessitating at least one of a newly crafted sole and footwear device. This process of crafting new shoes or other footwear devices to accommodate new changes in baseline foot geometry may continue to repeat, constituting a chain of incremental shoes or other footwear devices administered over time where each device is as the prior device with a slight modification in overall geometry. This chain of footwear devices administered over time terminates once the wearer's foot ceases to shift in baseline overall geometry, as determined by at least one of: a self-report by the wearer; a zero or negligible change in baseline overall foot geometry between two subsequent scans; alignment of all extensor longus tendons exactly with their respective metatarsals and phalanges as observed or characterized via any means; or exact or near-exact symmetry of each toenail respective to an infinite conceptual axis coincident with the extensor longus tendon associated with the toe associated with said toenail as observed or characterized via any means.

In addition to the baseline geometry outlined in this disclosure, at least one of the sole or the upper of the shoe or other footwear device may comprise unique lattice structures which confer desirable physical and mechanical characteristics.

For the sole, chiefly desired is the ability to bend, curl, and twist along both 2D flat profiles and 3D curved profiles. One way to achieve this is by constructing the sole portion in a 2D equilateral triangle or square pattern with a flexible material; 3D printing is an effective means of construction for such a lattice. Constructing the sole portion as thin upright walls of flexible material in an overall 2D equilateral triangle or square pattern imbues the sole with the ability to bend, curl, and twist perpendicular to the straight walls by virtue of the constituent shapes compressing or expanding along that plane; this ability, combined with the ability for the sole to bend, curl, and twist parallel to the straight walls by virtue of the flexibility with associated Young's modulus of the material, constitutes an isotropic or anisotropic ability to bend, curl, and twist depending on the Young's modulus of the material and density of triangle or square structures. Another way to achieve this is by constructing the sole portion in a 3D cubic or gyroid pattern with a flexible material; 3D printing is an effective means of construction for such a lattice. Constructing the sole portion as thin, straight lines of flexible material as thin slanted walls to form an overall 3D cubic pattern, or as thin curved lines so as to form a gyroid pattern, imbues the sole with the ability to bend, curl, and twist primarily along three-dimensionally curved profiles; by virtue of these 3D shapes and their construction from a flexible material, bending, curling, and twisting along a 2D plane parallel to flat ground is also possible.

When 3D printing is employed to additively manufacturing the upper, chiefly desired is tensile strength of the constituent structure of the upper to secure the sole of the shoe or other footwear device to the foot of the wearer without breaking; by extension, when the upper is considered further in its full 3D shape, it is desired for the whole upper to have the ability to bend, curl, and twist to as full an extent as the extent to which the sole may bend, curl, and twist. Further desired qualities may be, but are not limited to, light weight and stylishness. Simple creation of said upper is possible by means of extruding thin lines of flexible material atop one another, at a sufficient extrusion temperature for adjacent layers to bond together, to form a hollow shell; however, more advanced uppers may be created by altering the pattern of extrusion from a simple straight line to a more advanced profile. One such advanced upper manufacturing technique may be to randomly jitter the extrusion of each layer along the X-Y plane to introduce randomly placed points of exceptionally strongly bonded flexible material connected by tendrils of the same material weakly bonded to vertically adjacent layers. Another such advanced upper manufacturing method may be to randomly jitter the extrusion of each layer in the Z direction to introduce randomly placed points of exceptionally strongly bonded flexible material connected by tendrils of the same material weakly bonded to vertically adjacent layers. Yet another such method may be to print the upper as layers not of continuous lines but as discrete points or line segments stacked atop each other in a three-dimensionally slanted fashion at a sufficient density to constitute a more-or-less isotropic lattice; this lattice may be further bolstered in tensile strength by extruding thin lines of material between these discrete points or line segments so as to connect adjacent points or line segments to each other.

Certain material choices, lattice shapes of both the upper and sole, and other defining compositional characteristics of the shoe or other footwear device may imbue said shoe or other footwear device with a quality of being malleable on purpose; through this conferred ephemerality may be achieved higher utility. One embodiment of this may be as a sole which is plastically deformed, or "broken in," at a faster rate and/or to a greater degree than is typical for the soles and footwear of today; one may think of such an embodiment as a penultimate step in the process of manufacturing the shoe or other footwear device, wherein the final step of the process is a sufficient number of literal human steps upon the shoe or other footwear device to plastically deform its sole to its greatest extent. Such a process deforms the sole to more perfectly fit the exact plantar curvature of each unique foot of each unique wearer. Another embodiment may be in the form of an upper which may break at points while still preserving the overall structure and general level of tensile strength.

DETAILED DESCRIPTION OF THE DRAWINGS

Figure 1A:
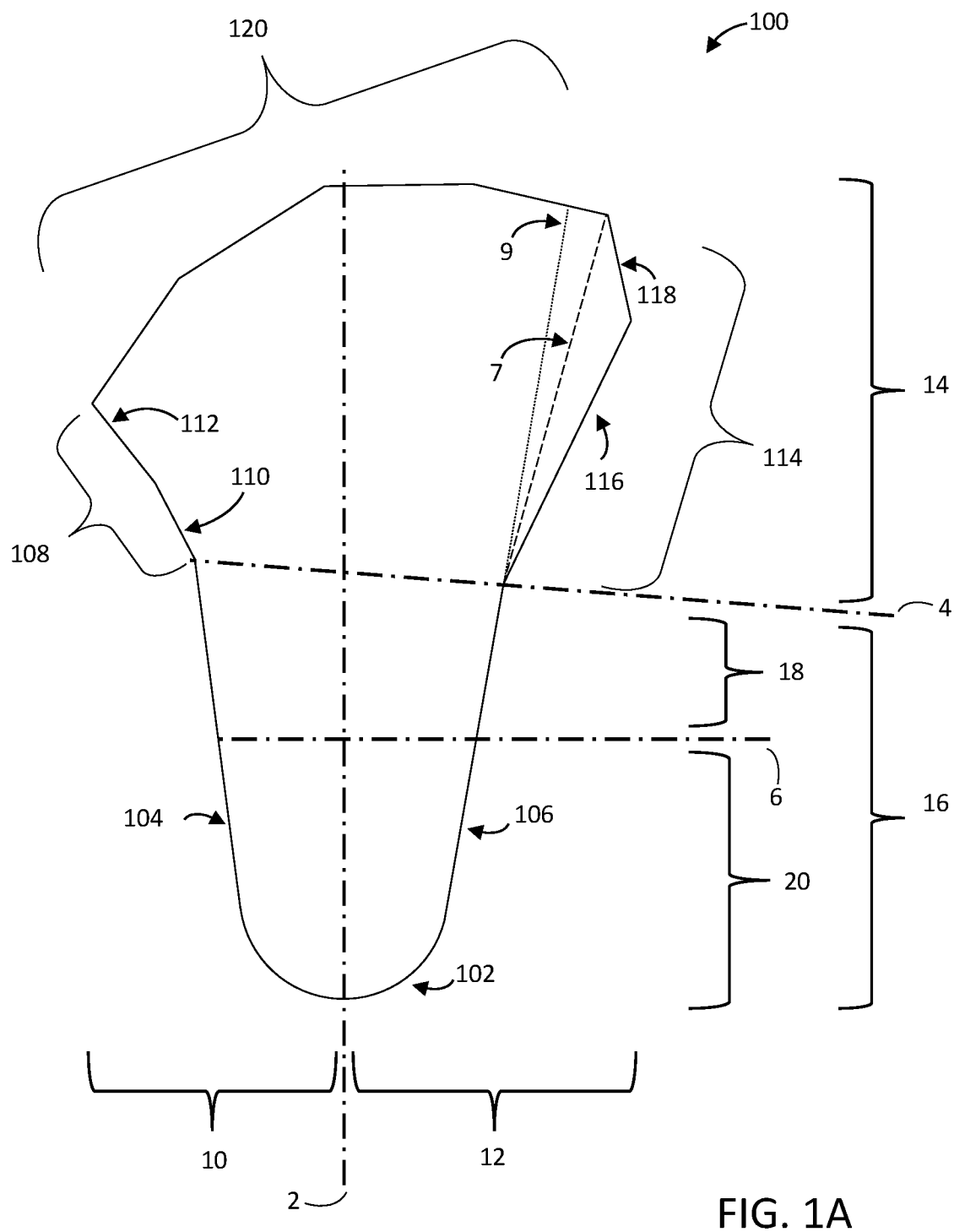
FIGS. 1A-B depict a sole for a shoe or other footwear device comprising a laterally and medially flared forefoot portion in accordance with an aspect of this disclosure.
Figure 1B:
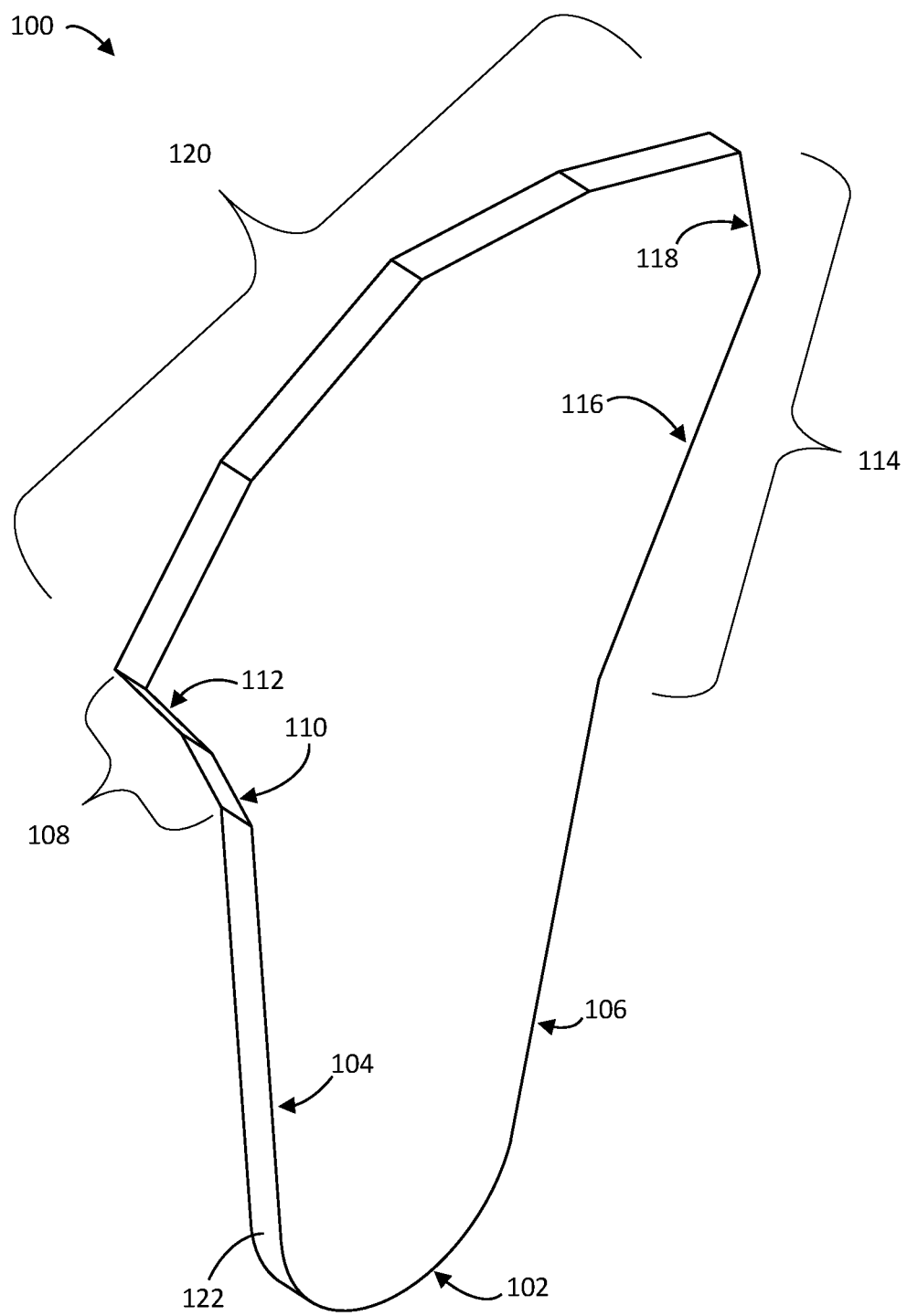

Reference is first made to FIGS. 1A-B to describe the key geometric elements of the sole 100 with a laterally and medially flared forefoot portion in its primitive form, as well as define baseline terminology used throughout this disclosure. This sole, as well as all soles and footwear devices referenced hereafter, correspond to a human left foot; it is known and understood that all corresponding right foot footwear devices may be formed by mirroring the image of any left foot footwear device. Furthermore, it is known and understood that the bulk of the following figures depict the bodies of soles, shoes, and other footwear devices in overall geometric shape; said bodies may be manufactured in a manner which is non-uniformly dense or isotropic, as non-uniform lattices and structures of material. Throughout the views, like components are denoted by like reference numbers.

As viewed aerially, the sole 100 is conceptually divided by a vertical reference plane 2 into a lateral portion 10 and a medial portion 11. The sole 100 is further conceptually divided by two horizontal reference planes 4,6. The top horizontal reference plane 4 divides the forefoot portion 12 and hindfoot portion 13. The bottom horizontal reference plane 6 further divides the hindfoot portion 13 into a midfoot portion 14 and a heel portion 15. It is understood that these conceptual boundaries and all further conceptual boundaries depicted as dot-dashed lines are presented for reference and do not appear as features of the disclosed invention.

The hindfoot portion 16 comprises a heel curve 102, a lateral hind edge 104, and a medial hind edge 106. The forefoot portion 14 comprises a lateral forefoot portion 108 intended to accommodate the full range of motion of the pinky toe of the wearer, a medial forefoot portion 114 intended to accommodate the full range of motion of the big toe of the wearer, and a front portion 120. The lateral forefoot portion 108 comprises a hindmost lateral forefoot edge 110 flared laterally relative to the lateral hindfoot portion edge 104 and a foremost lateral forefoot edge 112 flared laterally relative to the hindmost lateral forefoot edge 110. The medial forefoot portion 114 comprises a hindmost medial forefoot edge 116 flared medially relative to the medial hindfoot portion edge 106 and a foremost medial forefoot edge 118 flared laterally relative to the hindmost medial forefoot edge 116. Note that an imaginary line segment 7 connecting the hindmost and foremost points of the medial forefoot portion 114 also forms a medial flare relative to the medial hind edge 106. For illustrative purposes, coincident with the medial hind edge 106 is a medial hind edge reference line 9. The foremost terminating point of the foremost lateral forefoot edge 112 is connected to the foremost terminating point of the foremost medial forefoot edge 118 by a front portion 120. The depicted front portion 120 is as numerous discrete edges in an overall arc profile.

The enclosed profile formed by the front portion 120, lateral forefoot portion 108, medial forefoot portion 114, lateral hind edge 104, medial hind edge 106, and heel curve 102 is thickened to a uniform thickness 122 (not visible in FIG. 1A, visible in FIG. 1B) to form a sole 100 for a shoe or other footwear device.

Figure 2A:
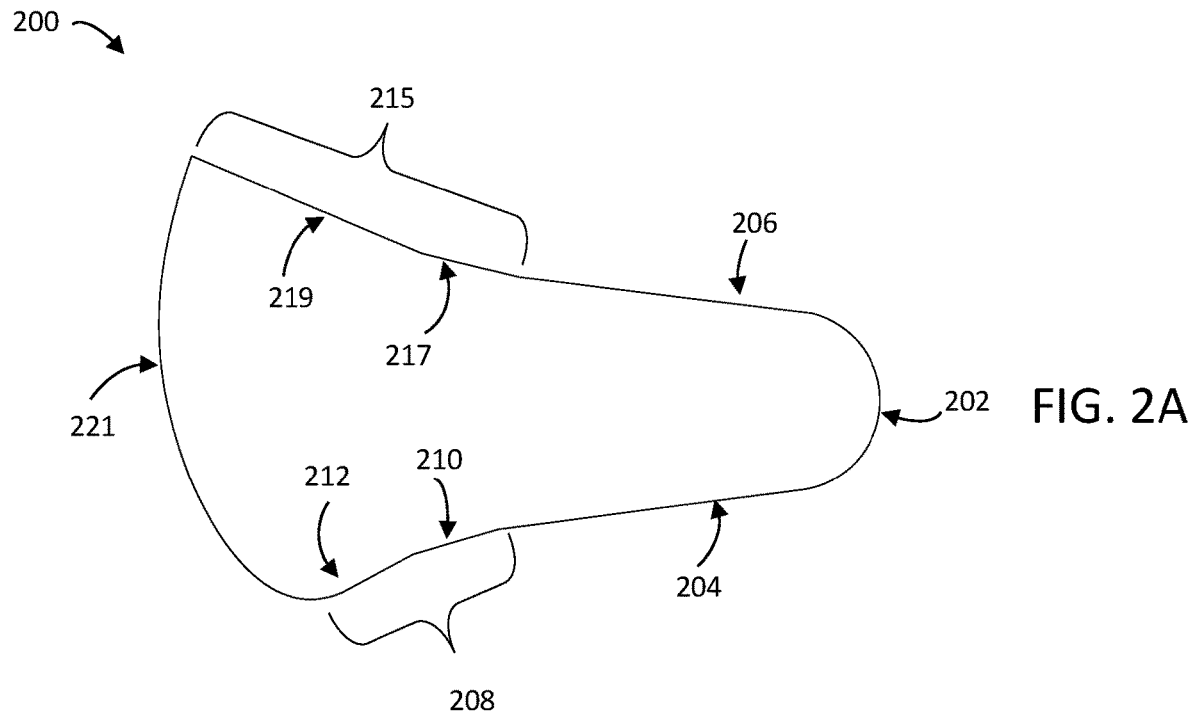
FIGS. 2A-B depict another sole for a shoe or other footwear device comprising a laterally and medially flared forefoot portion in accordance with an aspect of this disclosure.
Figure 2B:
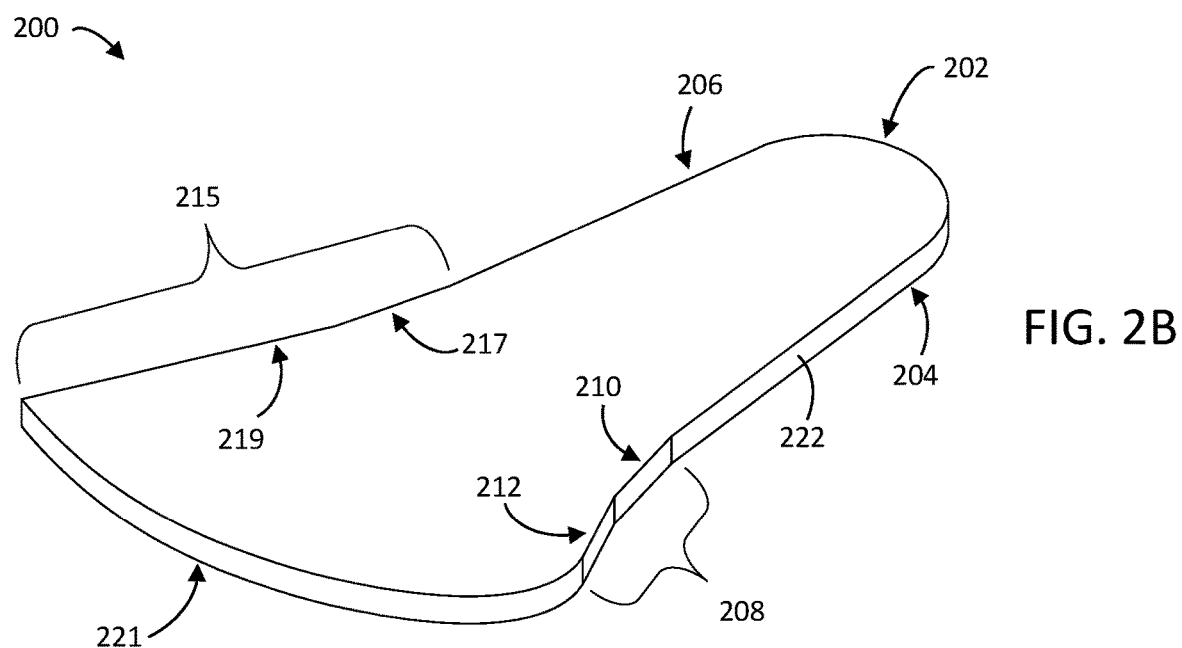

Reference is now made to FIGS. 2A-B to describe another sole 200 for a shoe or other footwear device comprising a laterally and medially flared forefoot portion.

The hindfoot portion comprises a heel curve 202, a lateral hind edge 204, and a medial hind edge 206. The forefoot portion comprises a lateral forefoot portion 208 intended to accommodate the full range of motion of the pinky toe of the wearer, a medial forefoot portion 215 intended to accommodate the full range of motion of the big toe of the wearer, and a front portion 221. The lateral forefoot portion 208 comprises a hindmost lateral forefoot edge 210 flared laterally relative to the lateral hindfoot portion edge 204 and a foremost lateral forefoot edge 212 flared laterally relative to the hindmost lateral forefoot edge 210. The medial forefoot portion 215 mimics the lateral forefoot portion 208 with a hindmost medial forefoot edge 217 flared medially relative to the medial hind edge 206 and a foremost medial forefoot edge 219 flared medially relative to the hindmost medial forefoot edge 217. The front portion 221 is as a smooth curve, extending smoothly from the foremost terminating point of the foremost lateral forefoot edge 212 and concluding at the foremost terminating point of the foremost medial forefoot edge 219.

The enclosed profile formed by the front portion 221, lateral forefoot portion 208, medial forefoot portion 215, lateral hind edge 204, medial hind edge 206, and heel curve 202 is thickened to a uniform thickness 222 (not visible in FIG. 2A, visible in FIG. 2B) to form a sole 200 for a shoe or other footwear device.

Figure 3A:
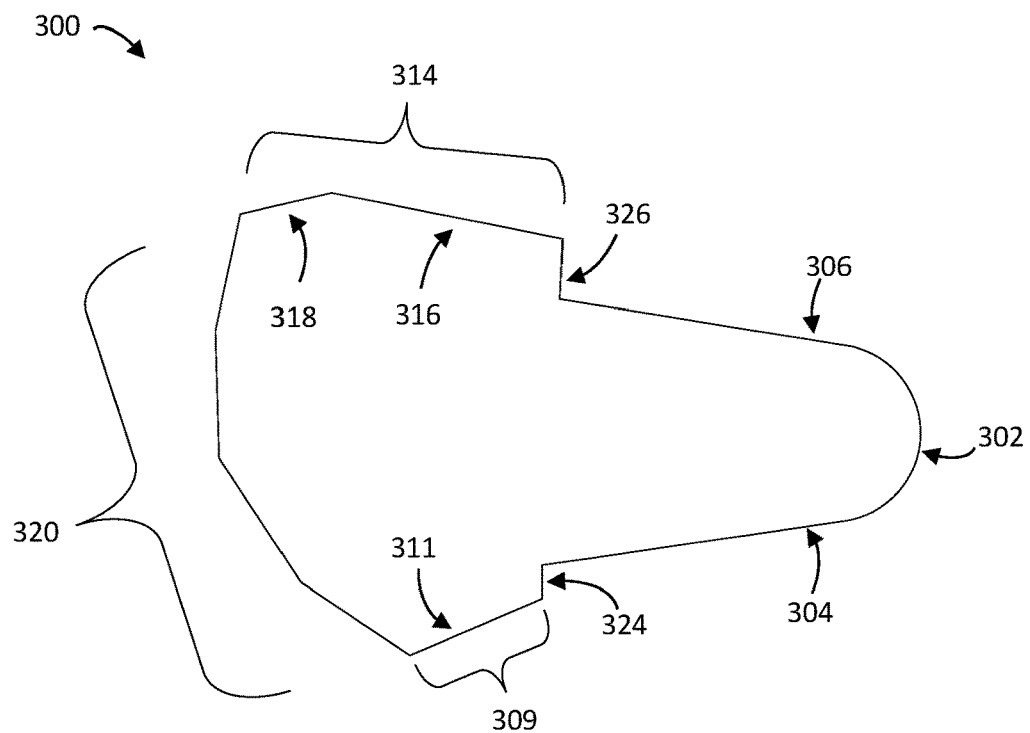
FIGS. 3A-B depict a sole for a shoe or other footwear device comprising a laterally and medially expanded forefoot portion in accordance with an aspect of this disclosure.
Figure 3B:
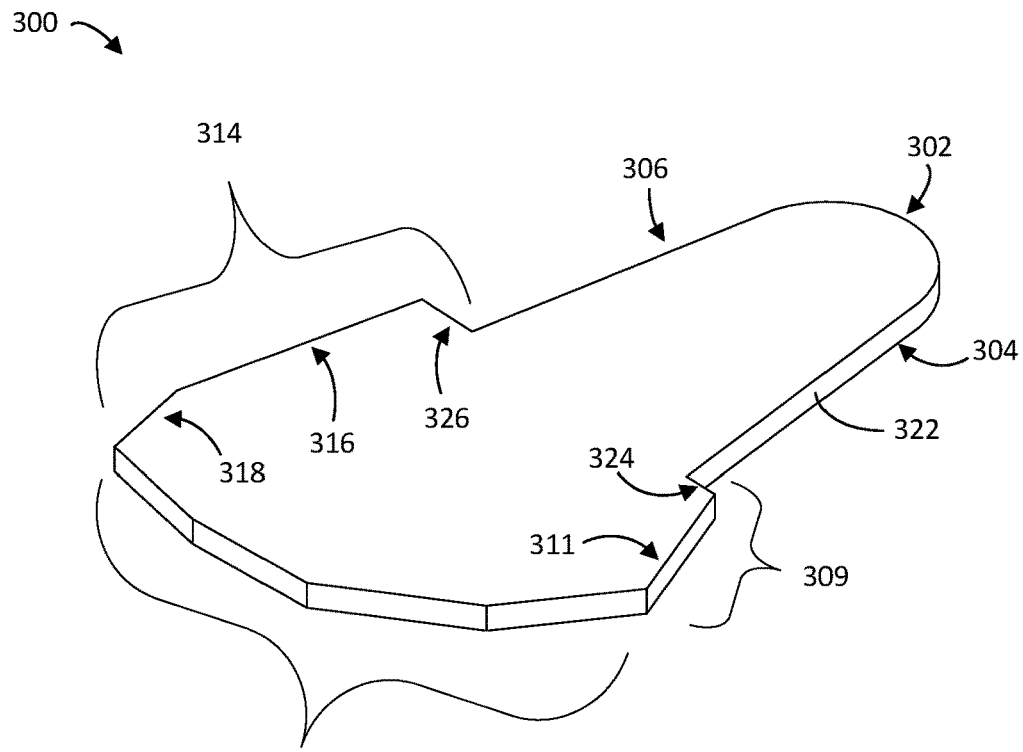

Reference is now made to FIGS. 3A-B to describe another sole 300 for a shoe or other footwear device comprising a laterally and medially expanded forefoot portion.

The hindfoot portion comprises a heel curve 302, a lateral hind edge 304, and a medial hind edge 306. The forefoot portion comprises a lateral forefoot portion 309 intended to accommodate the full range of motion of the pinky toe of the wearer, a medial forefoot portion 314 intended to accommodate the full range of motion of the big toe of the wearer, and a front portion 320. The lateral forefoot portion 309 comprises an abrupt outwardly extending lateral edge 324 and a single flared lateral forefoot edge 311. The medial forefoot portion 314 comprises an abrupt outwardly extending medial edge 326, a hindmost medial forefoot edge 316, and a foremost medial forefoot edge 318 flared laterally relative to the hindmost medial forefoot edge 316. The foremost terminating point of the lateral forefoot edge 311 is connected to the foremost terminating point of the foremost medial forefoot edge 318 by a front portion 320. The depicted front portion 320 is as numerous discrete edges in an overall arc profile.

The enclosed profile formed by the front portion 320, lateral forefoot portion 309, medial forefoot portion 314, lateral hind edge 304, medial hind edge 306, and heel curve 302 is thickened to a uniform thickness 322 (not visible in FIG. 3A, visible in FIG. 3B) to form a sole 300 for a shoe or other footwear device.

Figure 4A:
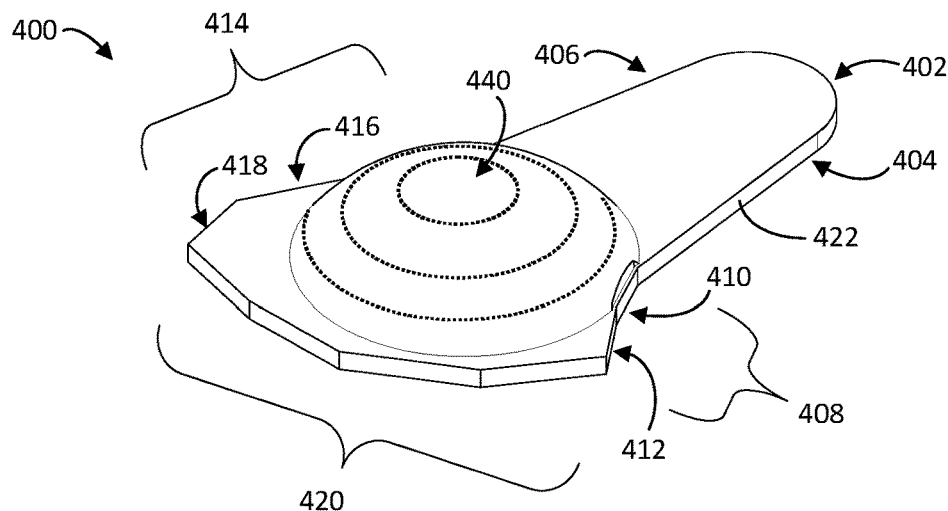
FIGS. 4A-C depict a sole for a shoe or other footwear device comprising a laterally and medially flared forefoot portion and a substantial spherical protrusion centered within the forefoot portion accordance with an aspect of this disclosure.
Figure 4B:
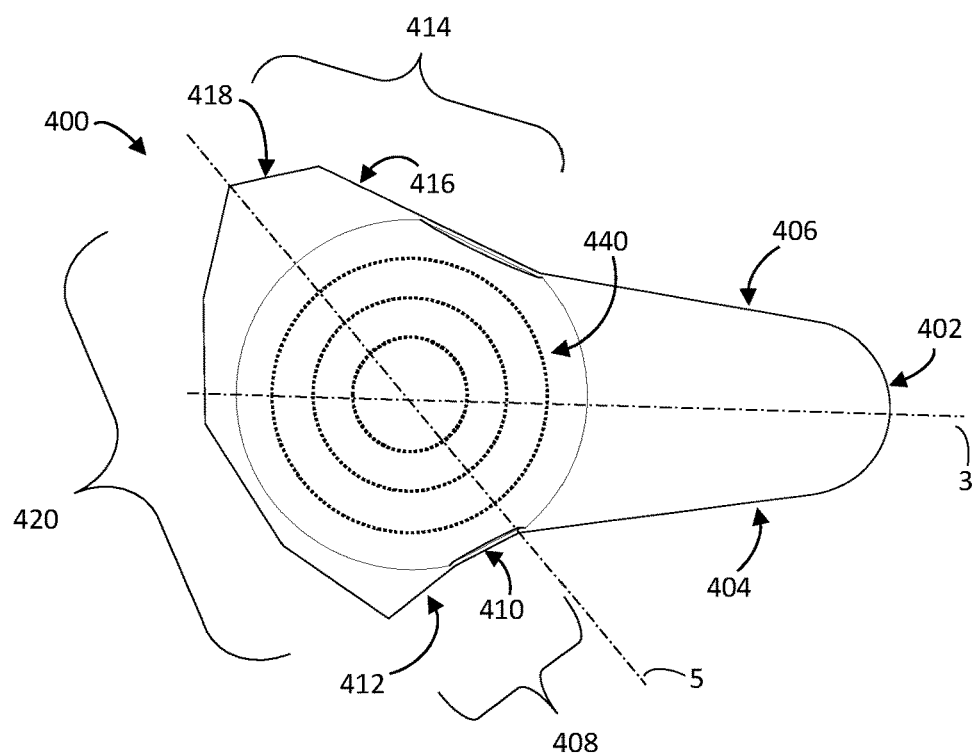
Figure 4C:
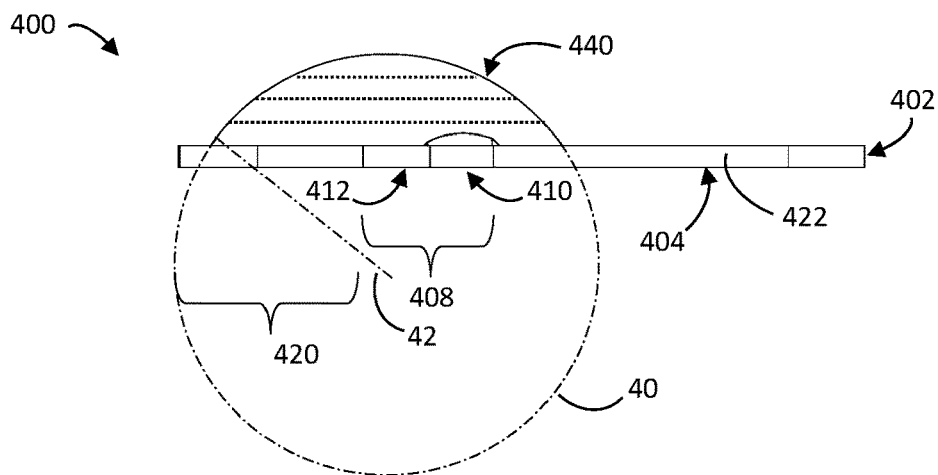

Reference is now made to FIGS. 4A-C to describe a sole 400 for a shoe or other footwear device comprising a laterally and medially expanded forefoot portion and a substantial spherical protrusion centered within the forefoot portion.

The hindfoot portion comprises a heel curve 402, a lateral hind edge 404, and a medial hind edge 406. The forefoot portion comprises a lateral forefoot portion 408 intended to accommodate the full range of motion of the pinky toe of the wearer, a medial forefoot portion 414 intended to accommodate the full range of motion of the big toe of the wearer, and a front portion 420. The lateral forefoot portion 408 comprises a hindmost lateral forefoot edge 410 flared laterally relative to the lateral hindfoot portion edge 404 and a foremost lateral forefoot edge 412 flared laterally relative to the hindmost lateral forefoot edge 410. The medial forefoot portion 414 comprises a hindmost medial forefoot edge 416 flared medially relative to the medial hindfoot portion edge 406 and a foremost medial forefoot edge 418 flared laterally relative to the hindmost medial forefoot edge 416. The foremost terminating point of the foremost lateral forefoot edge 412 is connected to the foremost terminating point of the foremost medial forefoot edge 418 by a front portion 420. The depicted front portion 420 is as numerous discrete edges in an overall arc profile.

The enclosed profile formed by the front portion 420, lateral forefoot portion 408, medial forefoot portion 414, lateral hind edge 404, medial hind edge 406, and heel curve 402 is thickened to a uniform thickness 422 (visible in FIGS. 4A and 4C, not visible in FIG. 4B) to form the base of this sole 400 for a shoe or other footwear device.

The forefoot portion further comprises a substantial spherical protrusion 440. Said spherical protrusion 440 spans all or most of the width of the forefoot portion and covers all or most of the area of the forefoot portion. Dotted lines in these and all further figures illustrate the spherical nature of these spherical protrusions. As illustrated in FIG. 4B, said spherical protrusion 440 is centered at or near the intersection of the midline 3 of the sole 400 and a transverse reference line 5 intersecting the hindmost terminating point of the lateral forefoot portion 408 and the foremost terminating point of the medial forefoot portion 414. To better illustrate the exact curvature of said spherical protrusion 440, FIG. C depicts a reference whole sphere 40 concentric and coincident with the spherical protrusion 440 as well as a corresponding reference radius 42. The spherical protrusion 440 is formed from a portion of only the upper hemisphere of the reference whole sphere 40.

Reference is now made to FIGS. 5A-D to describe another sole 500 for a shoe or other footwear device comprising a laterally and medially flared forefoot portion, a substantial spherical protrusion centered within the forefoot portion, a secondary spherical profile covering the entire remainder of the forefoot portion, and a raised heel portion.

The superior surface of the raised heel portion 570 with which the heel of the wearer interfaces is bounded by a U-shaped superior heel boundary 503 and an anterior heel curve 574. The U-shaped heel boundary 503 is flared downwardly and outwardly at a uniform angle to a U-shaped inferior heel boundary 573. The anterior heel curve 574 is flared downwardly and outwardly to join with a midfoot connecting section 560 centrally and terminate at the inferior side at curved anterior heel edges 576a,b. The topmost portion of this flared side is filleted 578 for enhanced comfort.

The midfoot connecting section 560 is bounded by the raised heel portion 570, a lateral midfoot edge 504, a medial midfoot edge 506, and the forefoot portion. The 2D profile enclosed by these features is thickened to a uniform thickness 522.

The forefoot portion comprises a lateral forefoot portion 508 intended to accommodate the full range of motion of the pinky toe of the wearer, a medial forefoot portion 514 intended to accommodate the full range of motion of the big toe of the wearer, and a front portion 520. The lateral forefoot portion 508 comprises a hindmost lateral forefoot edge 510 flared laterally relative to the lateral midfoot edge 504 and a foremost lateral forefoot edge 512 flared laterally relative to the hindmost lateral forefoot edge 510. The medial forefoot portion 514 comprises a hindmost medial forefoot edge 516 flared medially relative to the medial midfoot portion edge 506 and a foremost medial forefoot edge 518 flared laterally relative to the hindmost medial forefoot edge 516. The foremost terminating point of the foremost lateral forefoot edge 512 is connected to the foremost terminating point of the foremost medial forefoot edge 518 by a front portion 520. The depicted front portion 520 is as numerous discrete edges in an overall arc profile.

Figure 5A:
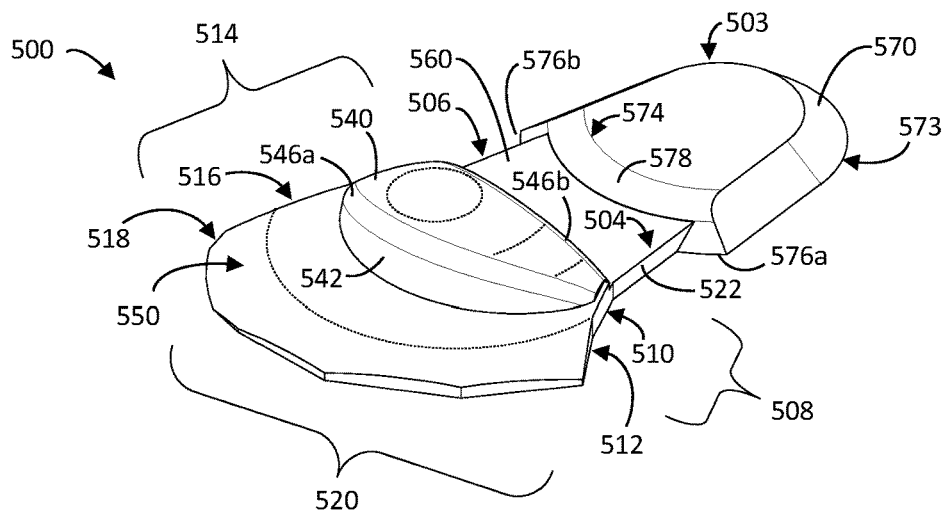
FIGS. 5A-D depict another sole for a shoe or other footwear device comprising a laterally and medially flared forefoot portion, a substantial spherical protrusion centered within the forefoot portion, a secondary spherical profile covering the entire remainder of the forefoot portion, and a raised heel portion in accordance with an aspect of this disclosure.
Figure 5B:
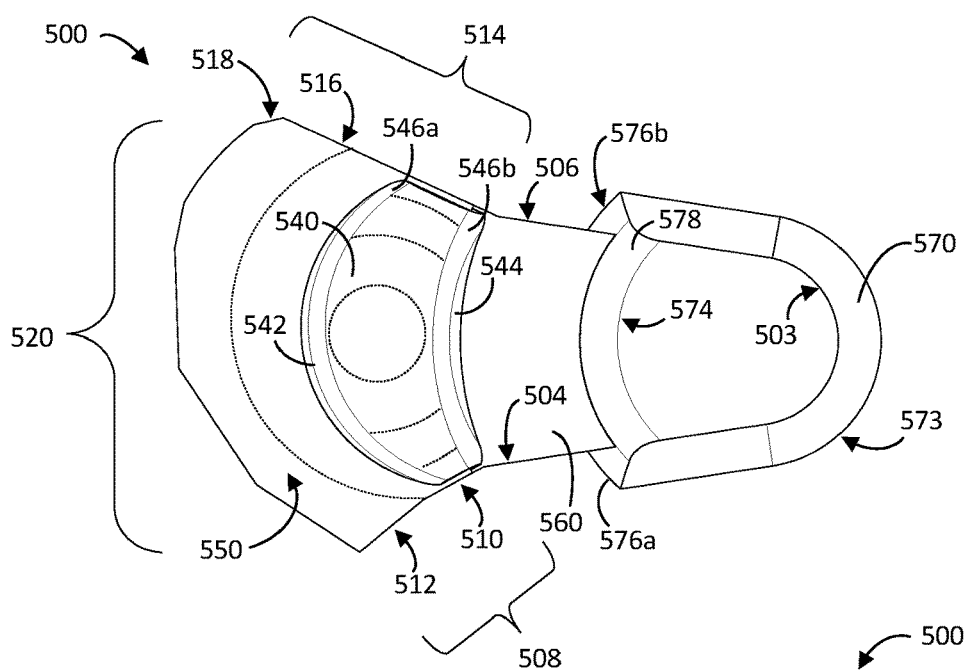
Figure 5C:
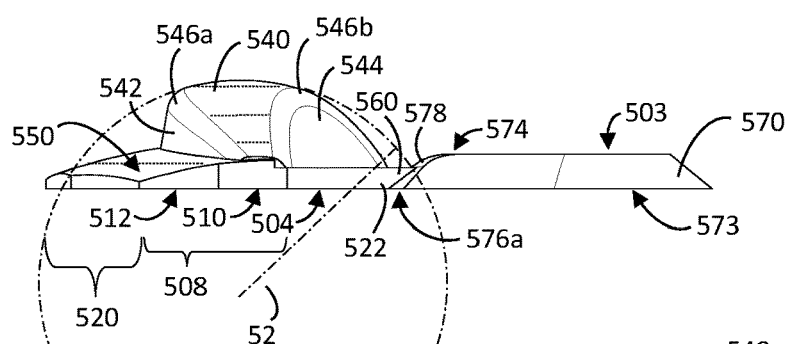
Figure 5D:
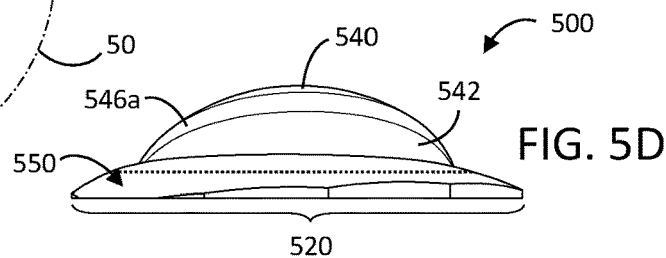

The forefoot portion further comprises a substantial spherical protrusion 540. Said spherical protrusion 540 spans all or most of the width of the forefoot portion with a center at or near the midpoint between the hindmost terminating point of the lateral forefoot portion 508 and the foremost terminating point of the medial forefoot portion 514. Commensurate with the shape of the human toe knuckle system, the spherical protrusion 540 takes the shape of a crescent. This crescent profile comprises a convex shelf 542 at the forefront and a concave shelf 544 at the hind side (obscured in FIGS. 5A,D, visible in FIGS. 5B,C). For enhanced comfort, both shelves 542,544 are filleted 546a,b at the topmost portion. To better illustrate the curvature of said spherical protrusion 540, FIG. 5C depicts a reference whole sphere 50 concentric and coincident with the spherical protrusion 540 as well as a corresponding reference radius 52. The spherical protrusion 540 is formed from a portion of only the upper hemisphere of the reference whole sphere 50. The apex of the spherical protrusion 540 is at a higher height than the superior side of the raised heel portion 570; this sole 500 can be said to have negative drop from the posterior end to the anterior end.

The forefoot portion further comprises a secondary spherical profile 550 which covers all forefoot portion area not covered by the substantial spherical protrusion 540. The radius of this spherical profile 550 is larger than the characteristic radius 52 of the spherical protrusion 540. The secondary spherical profile 550 is not necessarily concentric with the spherical protrusion 540 when viewed aerially but is centered towards the hind side of the forefoot portion and near the midline of the overall sole 500.

Figure 6A:
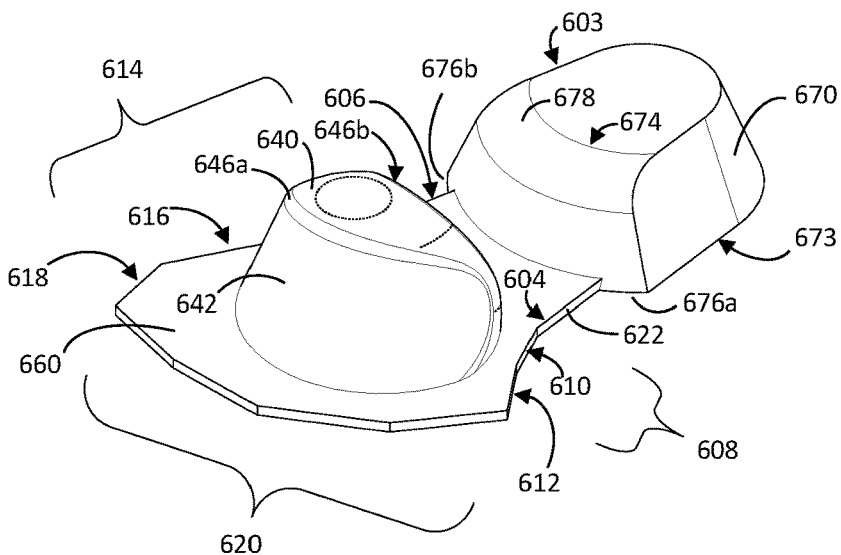
FIGS. 6A-C depict another sole for a shoe or other footwear device comprising a laterally and medially flared forefoot portion, a substantial spherical protrusion centered within the forefoot portion and elevated to a higher height relative to that of the spherical protrusion depicted by FIGS. 5A-D, and a raised heel portion elevated to a higher height relative to that of the heel portion depicted by FIGS. 5A-D, in accordance with an aspect of this disclosure.
Figure 6B:
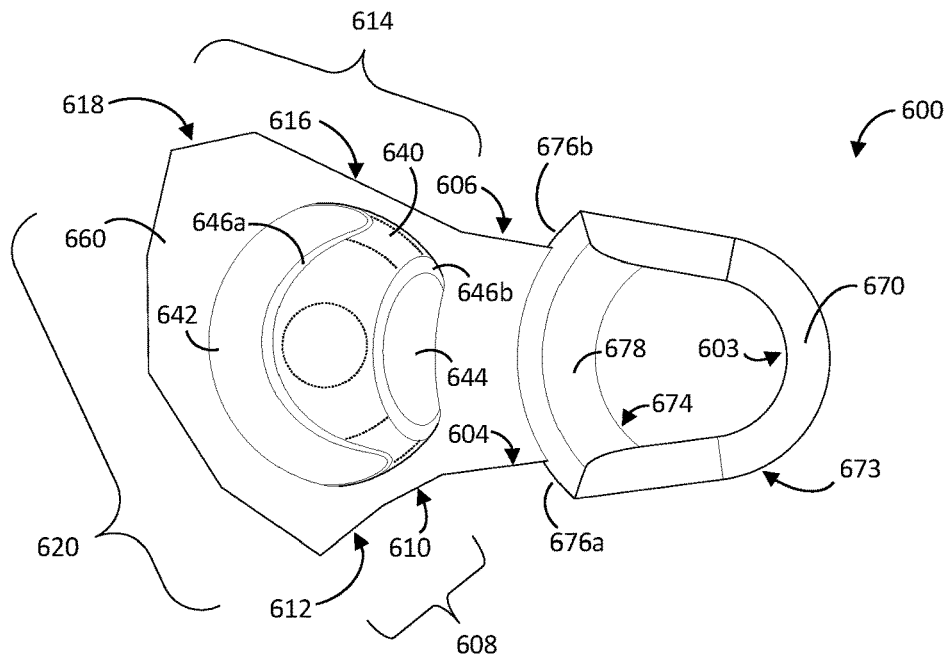
Figure 6C:
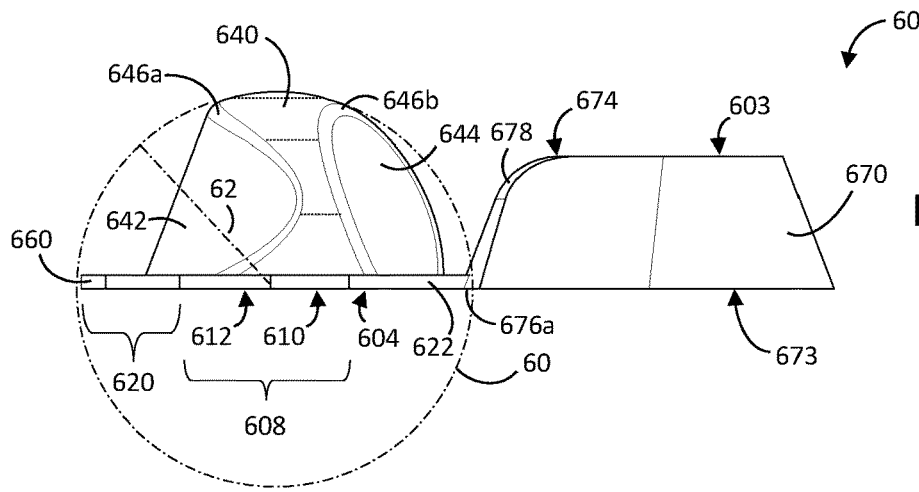

Reference is now made to FIGS. 6A-C to describe another sole 600 for a shoe or other footwear device comprising a laterally and medially expanded forefoot portion, a substantial spherical protrusion centered within the forefoot portion, and an elevated heel portion.

The superior surface of the raised heel portion 670 with which the heel of the wearer interfaces is bounded by a U-shaped superior heel boundary 603 and an anterior heel curve 674. The U-shaped heel boundary 603 is flared downwardly and outwardly at a uniform angle to a U-shaped inferior heel boundary 673. The anterior heel curve 674 is flared downwardly and outwardly to join with a midfoot-forefoot base 660 centrally and terminate at the inferior side at curved anterior heel edges 676a,b. The topmost edge of the anterior side is filleted 678 for enhanced comfort.

The midfoot portion of the midfoot-forefoot base 660 is bounded by the raised heel portion 670, a lateral midfoot edge 604, and a medial midfoot edge 606. The forefoot portion of the midfoot-forefoot base 660 comprises a lateral forefoot portion 608 intended to accommodate the full range of motion of the pinky toe of the wearer, a medial forefoot portion 614 intended to accommodate the full range of motion of the big toe of the wearer, and a front portion 620. The lateral forefoot portion 608 comprises a hindmost lateral forefoot edge 610 flared laterally relative to the lateral midfoot edge 604 and a foremost lateral forefoot edge 612 flared laterally relative to the hindmost lateral forefoot edge 610. The medial forefoot portion 614 comprises a hindmost medial forefoot edge 616 flared medially relative to the medial midfoot portion edge 606 and a foremost medial forefoot edge 618 flared laterally relative to the hindmost medial forefoot edge 616. The foremost terminating point of the foremost lateral forefoot edge 612 is connected to the foremost terminating point of the foremost medial forefoot edge 618 by a front portion 620. The depicted front portion 620 is as numerous discrete edges in an overall arc profile.

The enclosed profile formed by the front portion 620, lateral forefoot portion 608, medial forefoot portion 614, lateral hind edge 604, medial hind edge 606, and anterior edge of the raised heel portion 670 is thickened to a uniform thickness 622 (visible in FIG. 6A,C, not visible in FIG. 6B) to form the midfoot-forefoot base 660.

The forefoot portion further comprises a substantial spherical protrusion 640. Said spherical protrusion 640 spans all or most of the width of the forefoot portion and, commensurate with the shape of the human toe knuckle system, is shaped as a crescent. This crescent profile comprises a convex shelf 642 at the forefront and a concave shelf 644 (obscured in FIG. 6A, visible in FIGS. 6B,C) at the hind side. For enhanced comfort, both shelves 642,644 are filleted 646a,b at the topmost edge. To better illustrate the curvature of said spherical protrusion 640, FIG. 6C depicts a reference whole sphere 60 concentric and coincident with the spherical protrusion 640 as well as a corresponding reference radius 62. The spherical protrusion 640 and reference whole sphere 60 have a center coplanar with the inferior side of the sole; the spherical protrusion 640 is as a cut-out of virtually the entire upper hemisphere of the reference whole sphere 60. The apex of the spherical protrusion 640 is at a higher height than the superior side of the raised heel portion 670; this sole 600 can be said to have negative drop from the posterior end to the anterior end.

Figure 7A:
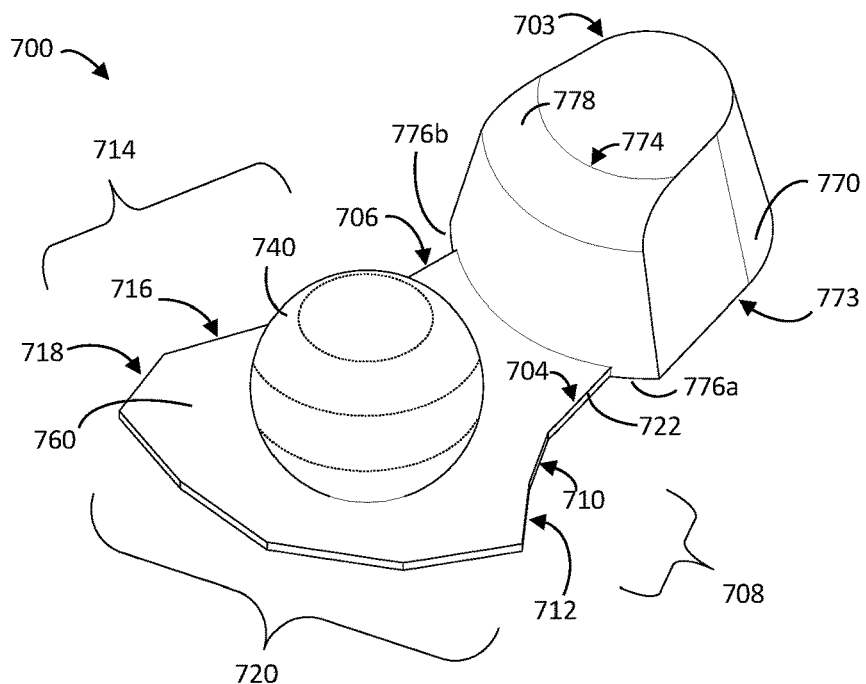
FIGS. 7A-C depict another sole for a shoe or other footwear device comprising a laterally and medially flared forefoot portion, a substantial spherical protrusion centered within the forefoot portion, and a raised heel portion, in accordance with an aspect of this disclosure.
Figure 7B:
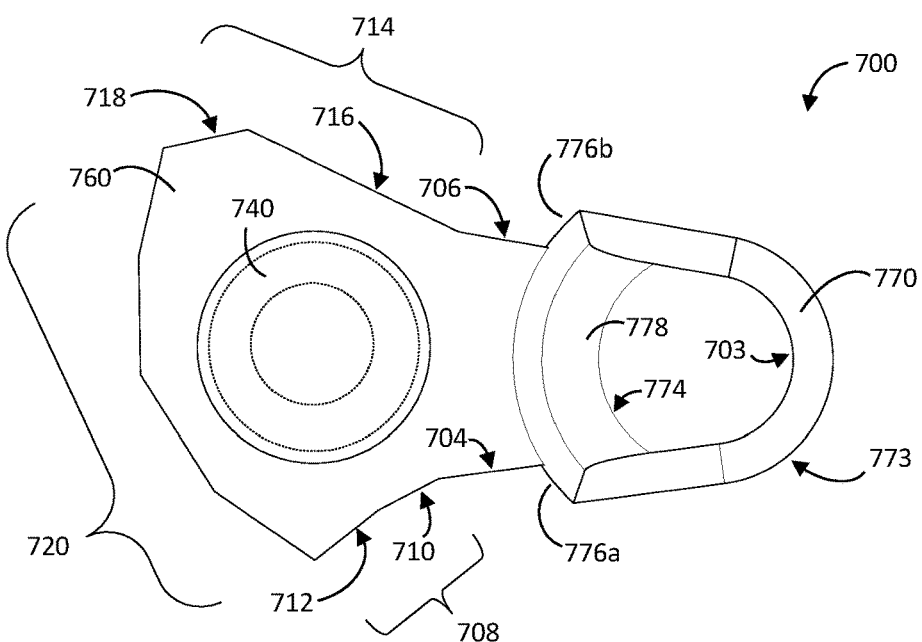
Figure 7C:
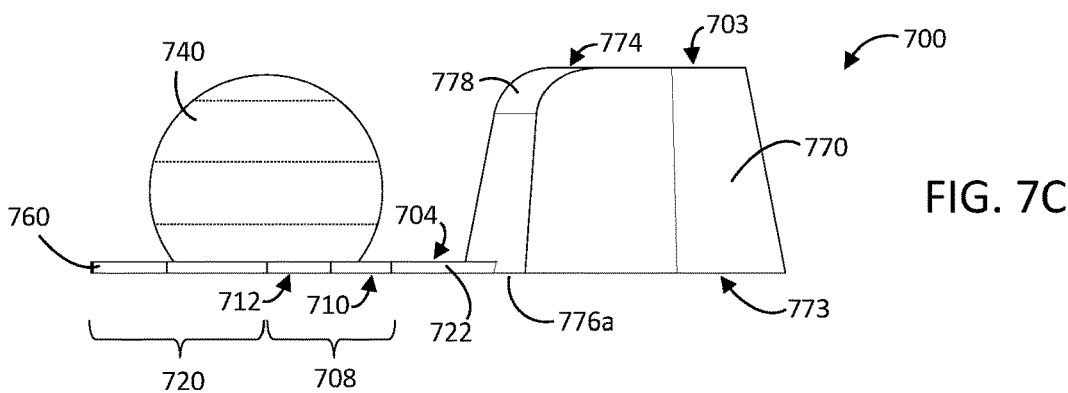

Reference is now made to FIGS. 7A-C to describe another sole 700 for a shoe or other footwear device comprising a laterally and medially expanded forefoot portion, a substantial spherical protrusion centered within the forefoot portion, and an elevated heel portion.

The superior surface of the raised heel portion 770 with which the heel interfaces is bounded by a U-shaped superior heel boundary 703 and an anterior heel curve 774. The U-shaped heel boundary 703 is flared downwardly and outwardly at a uniform angle to a U-shaped inferior heel boundary 773. The anterior heel curve 774 is flared downwardly and outwardly to join with a midfoot-forefoot base 760 centrally and terminate at the inferior side at curved anterior heel edges 776a,b. The topmost edge of the anterior side of the elevated heel portion 770 is filleted 778 for enhanced comfort.

The midfoot portion of the midfoot-forefoot base 760 is bounded by the raised heel portion 770, a lateral midfoot edge 704, and a medial midfoot edge 706. The forefoot portion of the midfoot-forefoot base 760 comprises a lateral forefoot portion 708 intended to accommodate the full range of motion of the pinky toe of the wearer, a medial forefoot portion 714 intended to accommodate the full range of motion of the big toe of the wearer, and a front portion 720. The lateral forefoot portion 708 comprises a hindmost lateral forefoot edge 710 flared laterally relative to the lateral midfoot edge 704 and a foremost lateral forefoot edge 712 flared laterally relative to the hindmost lateral forefoot edge 710. The medial forefoot portion 714 comprises a hindmost medial forefoot edge 716 flared medially relative to the medial midfoot portion edge 706 and a foremost medial forefoot edge 718 flared laterally relative to the hindmost medial forefoot edge 716. The foremost terminating point of the foremost lateral forefoot edge 712 is connected to the foremost terminating point of the foremost medial forefoot edge 718 by a front portion 720. The depicted front portion 720 is as numerous discrete edges in an overall arc profile.

The enclosed profile formed by the front portion 720, lateral forefoot portion 708, medial forefoot portion 714, lateral hind edge 704, medial hind edge 706, and anterior edge of the raised heel portion 770 is thickened to a uniform thickness 722 (visible in FIG. 7A,C, not visible in FIG. 7B) to form the midfoot-forefoot base 760.

The forefoot portion further comprises a substantial spherical protrusion 740. Said spherical protrusion 740 is as the majority of a whole sphere joined at the bottom with the forefoot-midfoot base 760. The apex of the spherical protrusion 740 is at a lower height than the superior side of the raised heel portion 770; this sole 700 can be said to have positive drop from the posterior end to the anterior end.

Figure 8A:
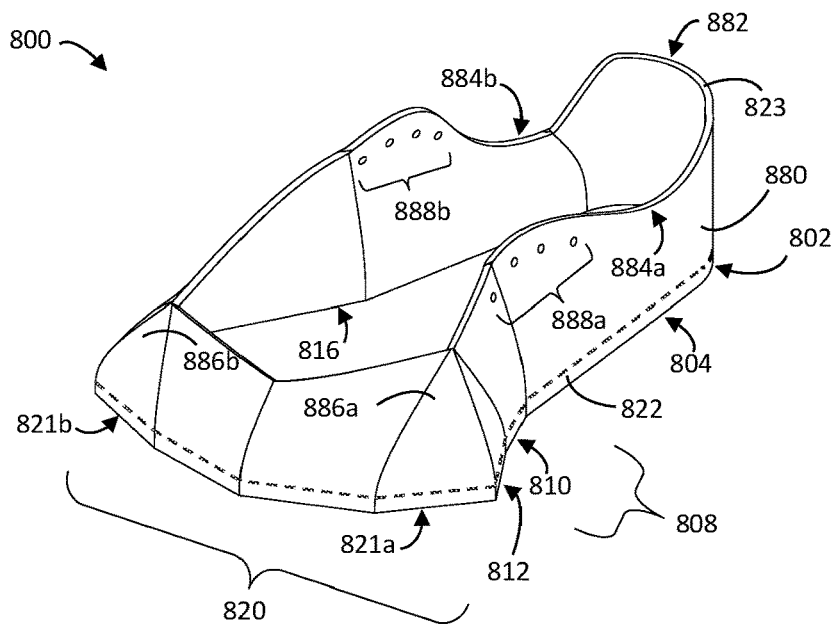
FIGS. 8A-C depict a shoe comprising a laterally and medially flared forefoot portion and an upper portion in accordance with an aspect of this disclosure.
Figure 8B:
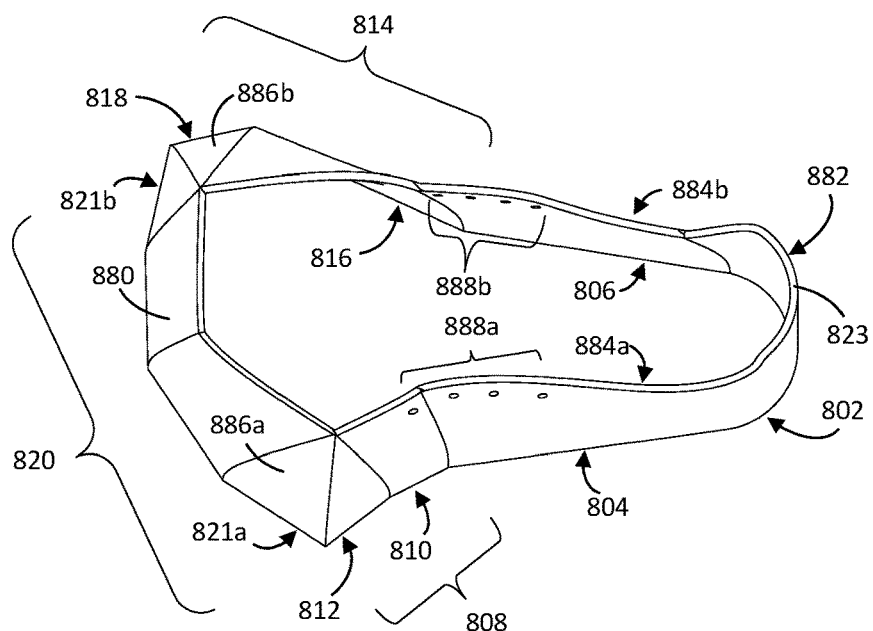
Figure 8C:
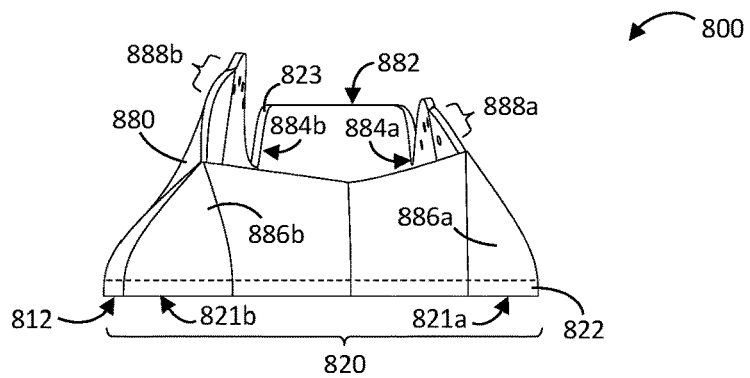

Reference is now made to FIGS. 8A-C to describe a monolithic shoe 800 intended for additive manufacturing via 3D printing with a flexible material. This shoe 800 comprises an upper portion and a sole portion, with the sole portion comprising a laterally and medially expanded forefoot portion.

The hindfoot portion of the sole portion comprises a heel curve 802, a lateral hind edge 804, and a medial hind edge 806. The forefoot portion of the sole portion comprises a lateral forefoot portion 808 intended to accommodate the full range of motion of the pinky toe of the wearer, a medial forefoot portion 884 intended to accommodate the full range of motion of the big toe of the wearer, and a front portion 820. The lateral forefoot portion 808 comprises a hindmost lateral forefoot edge 810 flared laterally relative to the lateral hindfoot portion edge 804 and a foremost lateral forefoot edge 812 flared laterally relative to the hindmost lateral forefoot edge 810. The medial forefoot portion 814 comprises a hindmost medial forefoot edge 816 flared medially relative to the medial hindfoot portion edge 806 and a foremost medial forefoot edge 818 flared laterally relative to the hindmost medial forefoot edge 816.

The enclosed profile formed by the front portion 820, lateral forefoot portion 808, medial forefoot portion 814, lateral hind edge 804, medial hind edge 806, and heel curve 802 is thickened to a uniform thickness 822 (not visible in FIG. 1B, visible in FIG. 1A,C) to form the sole portion of the shoe.

Joined with the sole portion to form a monolithic shoe 800 is an upper portion 880. Commensurate with the overall shape of the human foot, the upper portion 880 tapers upward from the exact shape of the perimeter of the basic sole 100 as depicted in FIG. 1A to a superior upper curve 882. The hindfoot portion of the superior upper curve 882 comprises dips 884a,b above the raised heel portion 870 to accommodate the lateral malleolus and medial malleolus. As can be viewed in FIG. 8C, the medial portion of the upper portion 880 extends farther vertically than the lateral portion.

The forefoot portion of the upper portion 880 further comprises a lateral tented portion 886a and a medial tented portion 886b. The lateral tented portion 886a tapers upward from the foremost lateral forefoot edge 812 and the lateral-most front portion edge 821a to a single point in a curved profile. The medial tented portion 886b tapers upward from the foremost medial forefoot edge 818 and the medial-most front portion edge 821b to a single point in a curved profile. These tented portions 886a,b afford the pinky toe and big toe of the wearer the space needed for vertical articulation in a shape that still covers said toes at the top.

The upper portion 880 further comprises rows of holes 888a,b through which laces are laced. Both rows of holes 888a,b begin at roughly the same position posteriorly; however, the medial row of holes 888b is compacted closer together and terminates before reaching the forefoot portion, while the lateral row of holes 888a is spaced farther apart and terminates within the forefoot portion. When laces are laced through these holes 888a,b in a standard crisscross pattern beginning at the anterior holes, the resulting web is fanned outwardly from the medial side to the lateral side. The anterior-most lace portion is thus roughly perpendicular to the extensor hallucis longus tendon of the intended wearer.

The upper portion 880 is thickened 823 to a uniform thickness. The resulting shoe 800 is as a monolithic body. To produce a final product, said monolithic body may be 3D printed using a flexible material.

Figure 9A:
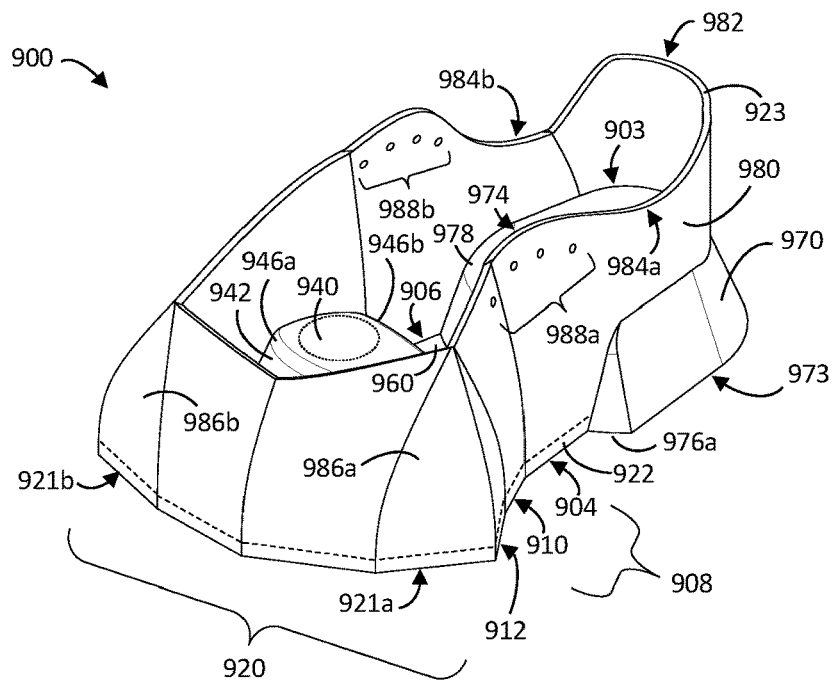
FIGS. 9A-C depict a shoe comprising a laterally and medially flared forefoot portion, a substantial spherical protrusion centered within the forefoot portion, a raised heel portion, and an upper portion, in accordance with an aspect of this disclosure.
Figure 9B:
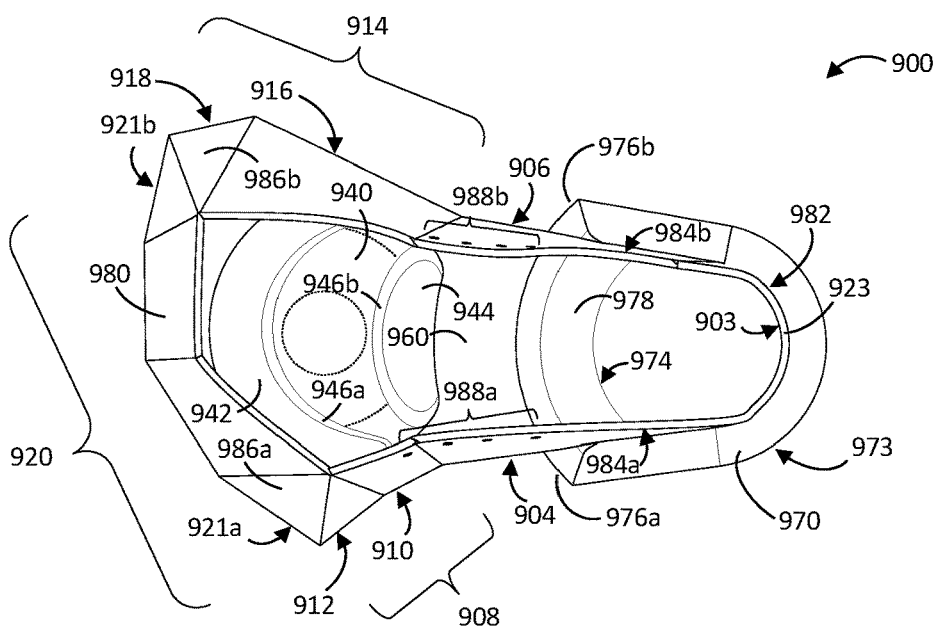
Figure 9C:
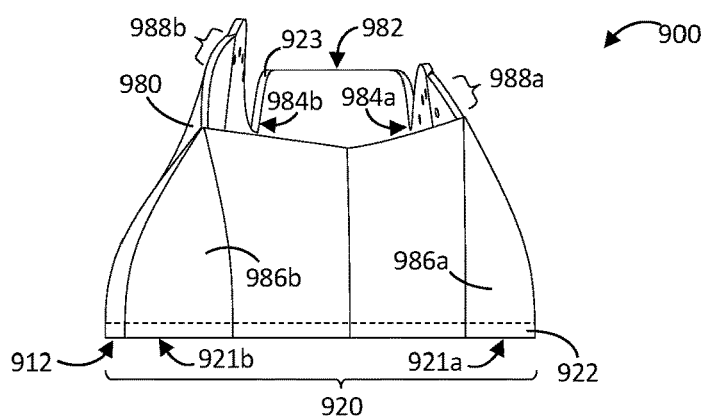

Reference is now made to FIGS. 9A-C to describe a monolithic shoe 900 intended for additive manufacturing via 3D printing with a flexible material. This shoe 900 comprises an upper portion and a sole portion, with the sole portion comprising a laterally and medially expanded forefoot portion, a substantial spherical protrusion centered within the forefoot portion, and an elevated heel portion. Note that FIG. 9C is included to show the portion of the upper portion which houses the medial forefoot portion, thus said upper portion obscures most features of the sole portion in this view.

The superior surface of the raised heel portion 970 with which the heel of the foot interfaces is bounded by a U-shaped superior heel boundary 903 and an anterior heel curve 974. The U-shaped heel boundary 903 is flared downwardly and outwardly at a uniform angle to a U-shaped inferior heel boundary 973. The anterior heel curve 974 is flared downwardly and outwardly to join with a midfoot-forefoot base 960 centrally and terminate at the inferior side at curved anterior heel edges 976a,b. The topmost edge of the anterior side of the elevated heel portion 970 is filleted 978 for enhanced comfort.

The midfoot portion of the midfoot-forefoot base 960 is bounded by the raised heel portion 970, a lateral midfoot edge 904, and a medial midfoot edge 906. The forefoot portion of the midfoot-forefoot base 960 comprises a lateral forefoot portion 908 intended to accommodate the full range of motion of the pinky toe of the wearer, a medial forefoot portion 914 intended to accommodate the full range of motion of the big toe of the wearer, and a front portion 920. The lateral forefoot portion 908 comprises a hindmost lateral forefoot edge 910 flared laterally relative to the lateral midfoot edge 904 and a foremost lateral forefoot edge 912 flared laterally relative to the hindmost lateral forefoot edge 910. The medial forefoot portion 914 comprises a hindmost medial forefoot edge 916 flared medially relative to the medial midfoot portion edge 906 and a foremost medial forefoot edge 918 flared laterally relative to the hindmost medial forefoot edge 916. The foremost terminating point of the foremost lateral forefoot edge 912 is connected to the foremost terminating point of the foremost medial forefoot edge 918 by a front portion 920. The depicted front portion 920 is as numerous discrete edges in an overall arc profile.

The enclosed profile formed by the front portion 920, lateral forefoot portion 908, medial forefoot portion 914, lateral hind edge 904, medial hind edge 906, and anterior edge of the raised heel portion 970 is thickened to a uniform thickness 922 (visible in FIG. 9A,C, not visible in FIG. 9B) to form the midfoot-forefoot base 960.

The forefoot portion further comprises a substantial spherical protrusion 940. Said spherical protrusion 940 spans all or most of the width of the forefoot portion with a center at or near the midpoint of a transverse reference line connecting the hindmost terminating point of the lateral forefoot portion 908 and the foremost terminating point of the medial forefoot portion 914. Commensurate with the shape of the human toe knuckle system, the spherical protrusion 940 takes the shape of a crescent. This crescent profile comprises a convex shelf 942 at the forefront and a concave shelf 944 at the hind side (obscured in FIG. 9A,C, visible in FIG. 9B). For enhanced comfort, both shelves 942,944 are filleted 946a,b at the topmost portion. The apex of the spherical protrusion 940 is at a higher height than the superior side of the raised heel portion 970; this shoe can be said to have negative drop from the posterior end to the anterior end.

Joined with the sole portion to form a monolithic shoe 900 is an upper portion 980. Commensurate with the overall shape of the human foot, the upper portion 980 tapers upward from the exact shape of the perimeter of the basic sole portion 100 as depicted in FIG. 1A to a superior upper curve 982. The hindfoot portion of the superior upper curve 982 comprises dips 984a,b above the raised heel portion 970 to accommodate the lateral malleolus and medial malleolus. As can be viewed in FIG. 9C, the medial portion of the upper portion 980 extends farther vertically than the lateral portion.

The forefoot portion of the upper portion 980 further comprises a lateral tented portion 986a and a medial tented portion 986b. The lateral tented portion 986a tapers upward from the foremost lateral forefoot edge 912 and the lateralmost front portion edge 921a to a single point in a curved profile. The medial tented portion 986b tapers upward from the foremost medial forefoot edge 918 and the medial-most front portion edge 921b to a single point in a curved profile. These tented portions 986a,b afford the pinky toe and big toe of the wearer the space needed for vertical articulation in a shape that still covers said toes at the top.

The upper portion 980 further comprises rows of holes 988a,b through which laces are laced. Both rows of holes 988a,b begin at roughly the same position posteriorly; however, the medial row of holes 988b is compacted closer together and terminates before reaching the forefoot portion, while the lateral row of holes 988a is spaced farther apart and terminates within the forefoot portion. When laces are laced through these holes 988a,b in a standard crisscross pattern beginning at the anterior holes, the resulting web is fanned outwardly from the medial side to the lateral side. The anterior-most lace portion is thus roughly perpendicular to the extensor hallucis longus tendon of the intended wearer.

The upper portion 980 is thickened 923 to a uniform thickness. The resulting shoe 900 is as a monolithic body. To produce a final product, said monolithic body may be 3D printed using a flexible material.

Figure 10:
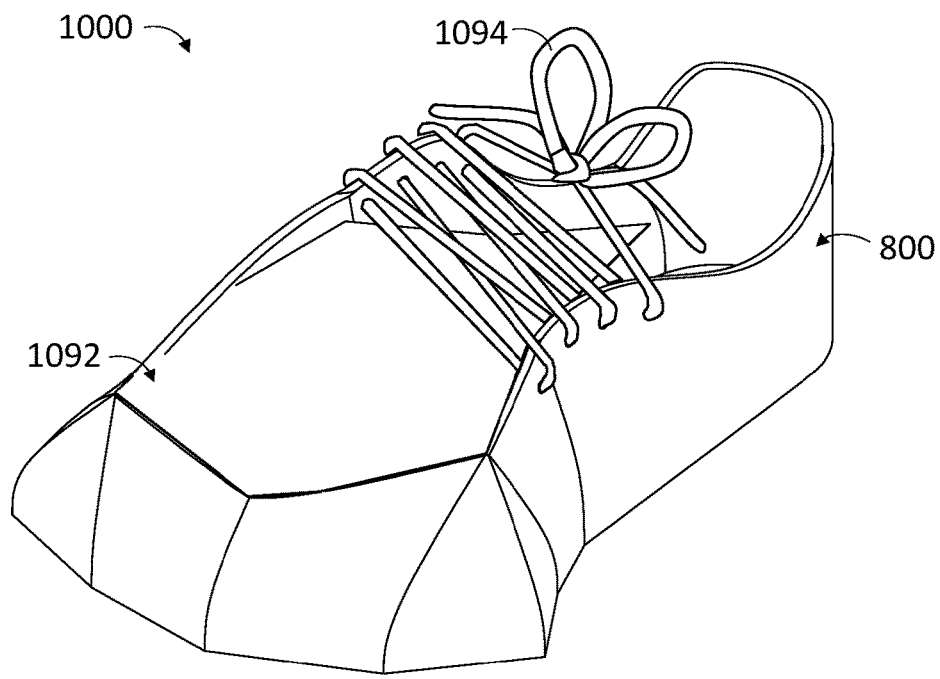
FIG. 10 depicts the shoe described by FIGS. 8A-C with an added upper cavity covering and laces, in accordance with an aspect of this disclosure.

FIG. 10A depicts the shoe described by FIGS. 8A-C with the addition of an optional top cavity covering 1092 as well as laces 1094. As most of the functional features are not visible, the base shoe 800 is incorporated by reference in its entirety.

Figure 11:
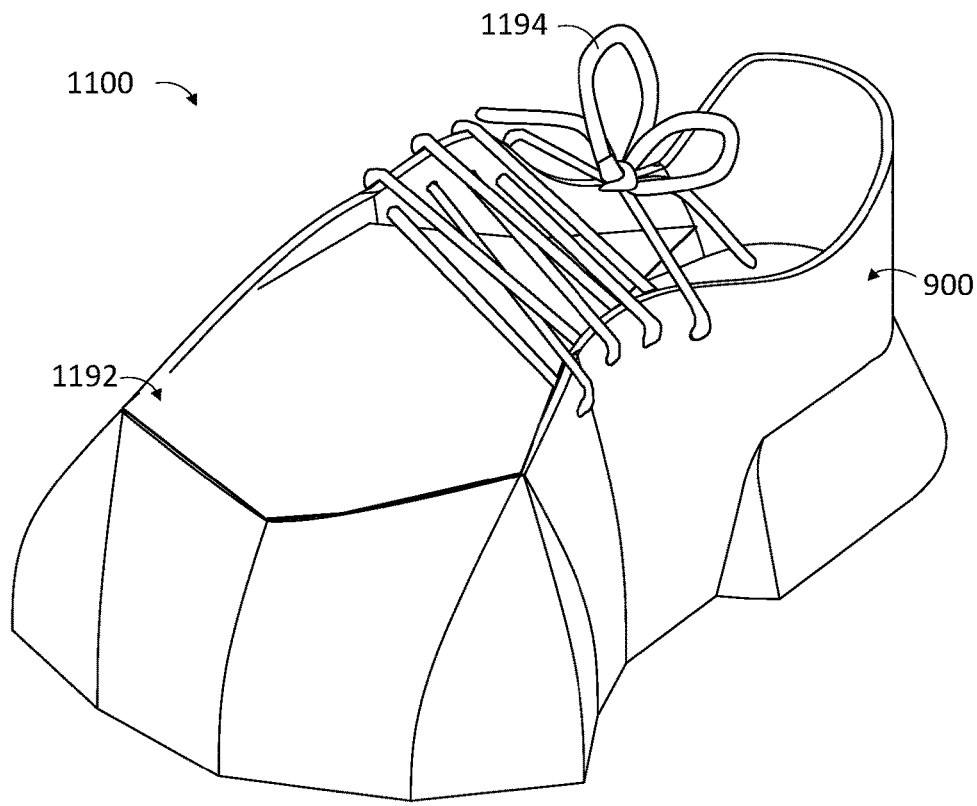
FIG. 11 depicts the shoe described by FIGS. 9A-C with an added upper cavity covering and laces, in accordance with an aspect of this disclosure.

FIG. 11A depicts the shoe described by FIGS. 9A-C with the addition of an optional top cavity covering 1192 as well as laces 1194. As most of the functional features are not visible, the base shoe 900 is incorporated by reference in its entirety.

Figure 12A:
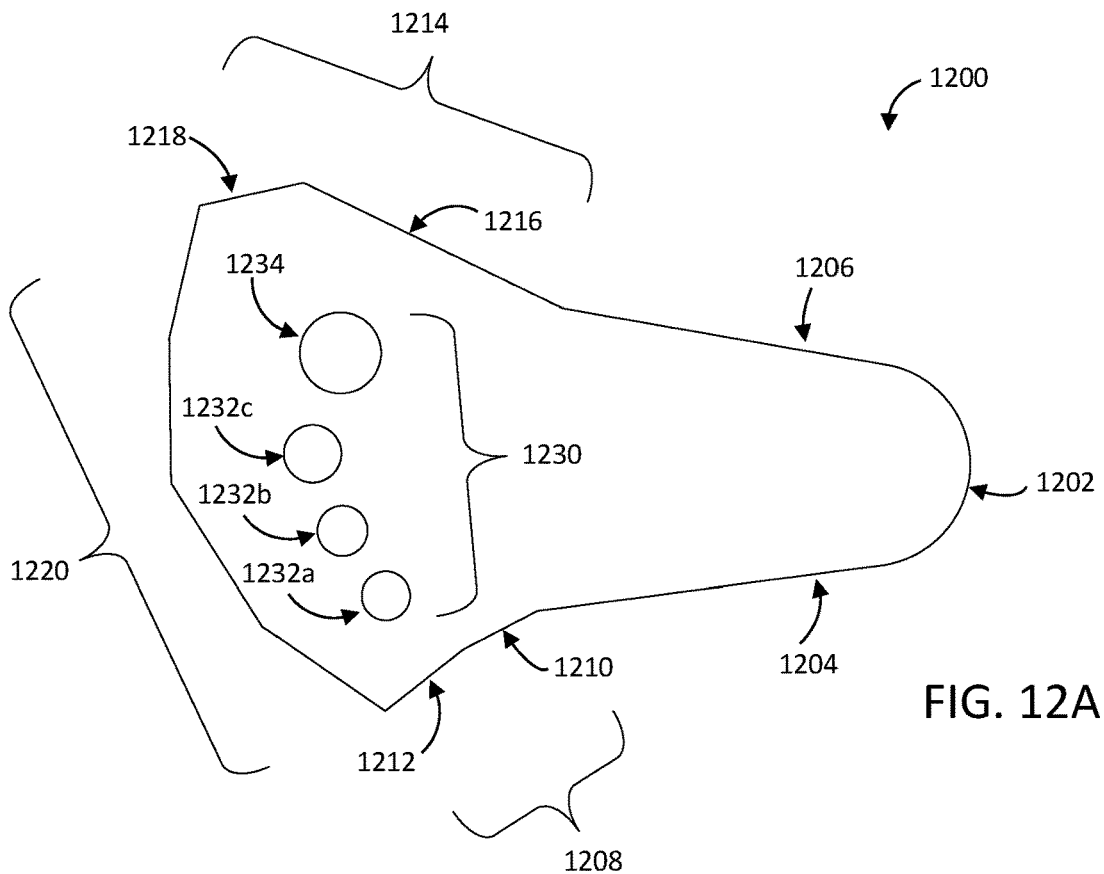
FIGS. 12A-B depict a sole for a shoe or other footwear device comprising a laterally and medially flared forefoot portion, as the sole depicted by FIGS. 1A-B, as well as physical toe separating structures, in accordance with an aspect of this disclosure.
Figure 12B:
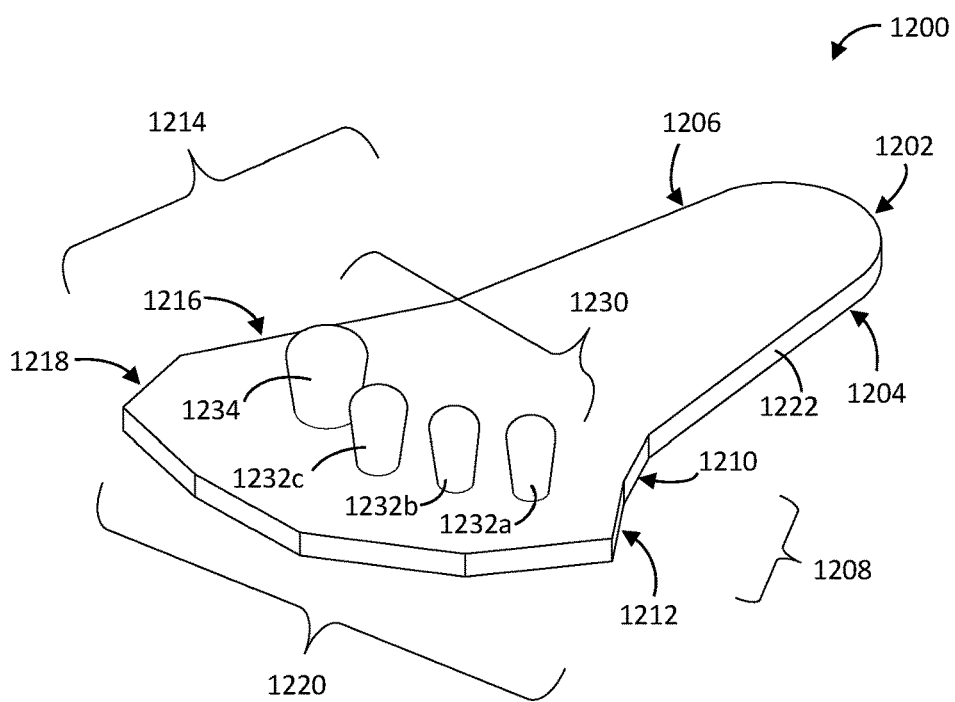

Reference is now made to FIGS. 12A-B to describe a sole 1200 for a shoe or other footwear device comprising a laterally and medially flared forefoot portion as well as physical toe separating structures.

The base portion of the sole 1200 is as the basic sole 100 depicted by FIGS. 1A-B. The hindfoot portion comprises a heel curve 1202, a lateral hind edge 1204, and a medial hind edge 1206. The forefoot portion comprises a lateral forefoot portion 1208 intended to accommodate the full range of motion of the pinky toe of the wearer, a medial forefoot portion 1214 intended to accommodate the full range of motion of the big toe of the wearer, and a front portion 1220. The lateral forefoot portion 1208 comprises a hindmost lateral forefoot edge 1210 flared laterally relative to the lateral hindfoot portion edge 1204 and a foremost lateral forefoot edge 1212 flared laterally relative to the hindmost lateral forefoot edge 1210. The medial forefoot portion 1214 comprises a hindmost medial forefoot edge 1216 flared medially relative to the medial hindfoot portion edge 1206 and a foremost medial forefoot edge 1218 flared laterally relative to the hindmost medial forefoot edge 1216. The foremost terminating point of the foremost lateral forefoot edge 1212 is connected to the foremost terminating point of the foremost medial forefoot edge 1218 by a front portion 1220. The depicted front portion 1220 is as numerous discrete edges in an overall arc profile.

The enclosed profile formed by the front portion 1220, lateral forefoot portion 1208, medial forefoot portion 1214, lateral hind edge 1204, medial hind edge 1206, and heel curve 1202 is thickened to a uniform thickness 1222 (not visible in FIG. 12A, visible in FIG. 12B) to form the base of this sole 1200 for a shoe or other footwear device.

This sole 1200 further comprises a system of individual toe separating structures 1230. Each of these structures 1232a-c, 1234 is as an upside-down conical profile with a curved top which may aid in the insertion or removal of said toes from said system of toe separating structures 1230. The toe separators' 1232a-c, 1234 embodiment as upside-down conical protrusions imbues each with the ability to aid in the securing of the overall sole or footwear device to the foot, i.e. the ability to counteract the gravitational forces which would otherwise pull the sole or footwear device downward and away from the foot when the foot is lifted off the ground;

further elements may or may not be incorporated to comprise a holistic footwear device securing system. Note that the big toe separator 1234 separating the big toe from the index toe may be larger than the little toe separators 1232a-c; furthermore, each of the little toe separators 1232a-c may be similar in size to one or more of the other little toe separators 1232a-c, but may not necessarily be the exact same size as one or more of the other little toe separators 1232a-c.

Figure 13:
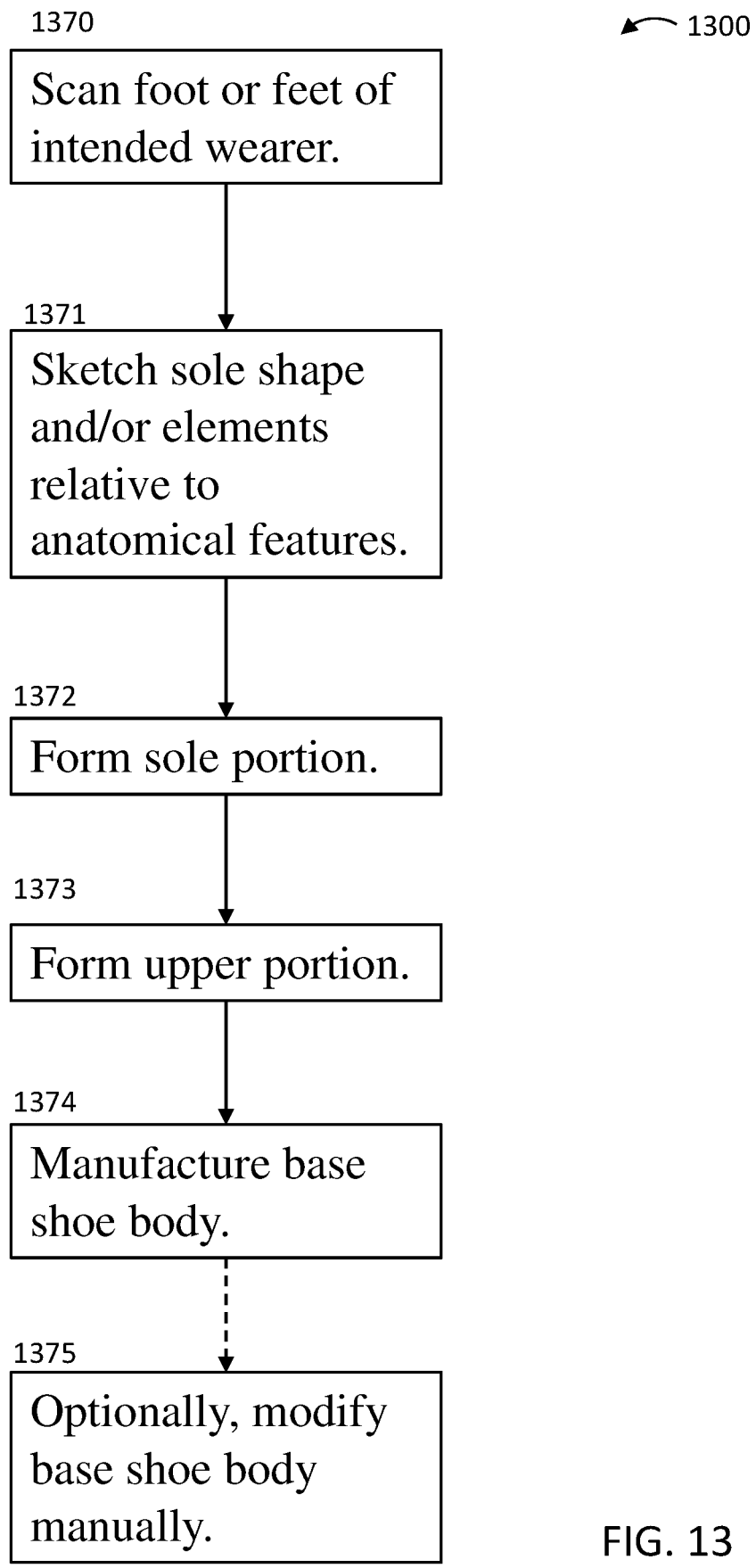
FIG. 13 depicts a process for custom-fitting a sole, shoe, or other footwear device to the foot or feet of a unique individual in accordance with an aspect of this disclosure.

Reference is now made to FIG. 13 to describe a process 1300 for custom fitting a shoe or pair of shoes to the foot or feet of a unique individual. The first step 1370 is to scan the foot or feet of the unique individual so as to produce a 2D or 3D representation of said foot or feet which may be characterized. The second step 1371 is to sketch a sole portion and any relevant constituent dimensions relative to the anatomy scanned and characterized in the first step 1370; of particular interest are the extensor longus tendons associated with the big toe and pinky toe. This step will be further qualified in FIGS. 15 and 16. The third step 1372 is to form a sole portion from the sketch made in step two 1371 by thickening said sketch profile to a uniform or near-uniform thickness, optionally incorporating any further desired sole elements in this base sole portion geometry. The fourth step 1373 is to form an upper portion by extruding as a thin hollow shell the sketch profile made in step two 1371 up to a superior upper profile in a shape which comfortably accommodates the whole foot when the shoe is ultimately worn by the target individual. The fifth step 1374 is to manufacture said base shoe body as a monolithic body using a flexible material; 3D printing is a good choice of manufacturing method for the fifth step 1374. The sixth step 1375, which may or may not be necessary depending on how prior steps are executed, is to modify the base shoe body manually; two relevant examples of this would be soldering an upper cavity covering to the top front lip of the base shoe body front portion using a soldering iron, and poking rows of lace holes in both the lateral and medial sides of the base shoe body using a soldering iron. If a shoe is desired for each foot, the process 1300 may be repeated, beginning with either a new scanning step 1370 to scan the opposite foot, or by simply mirroring the existing scan during the sole sketching step 1371.

Figure 14:
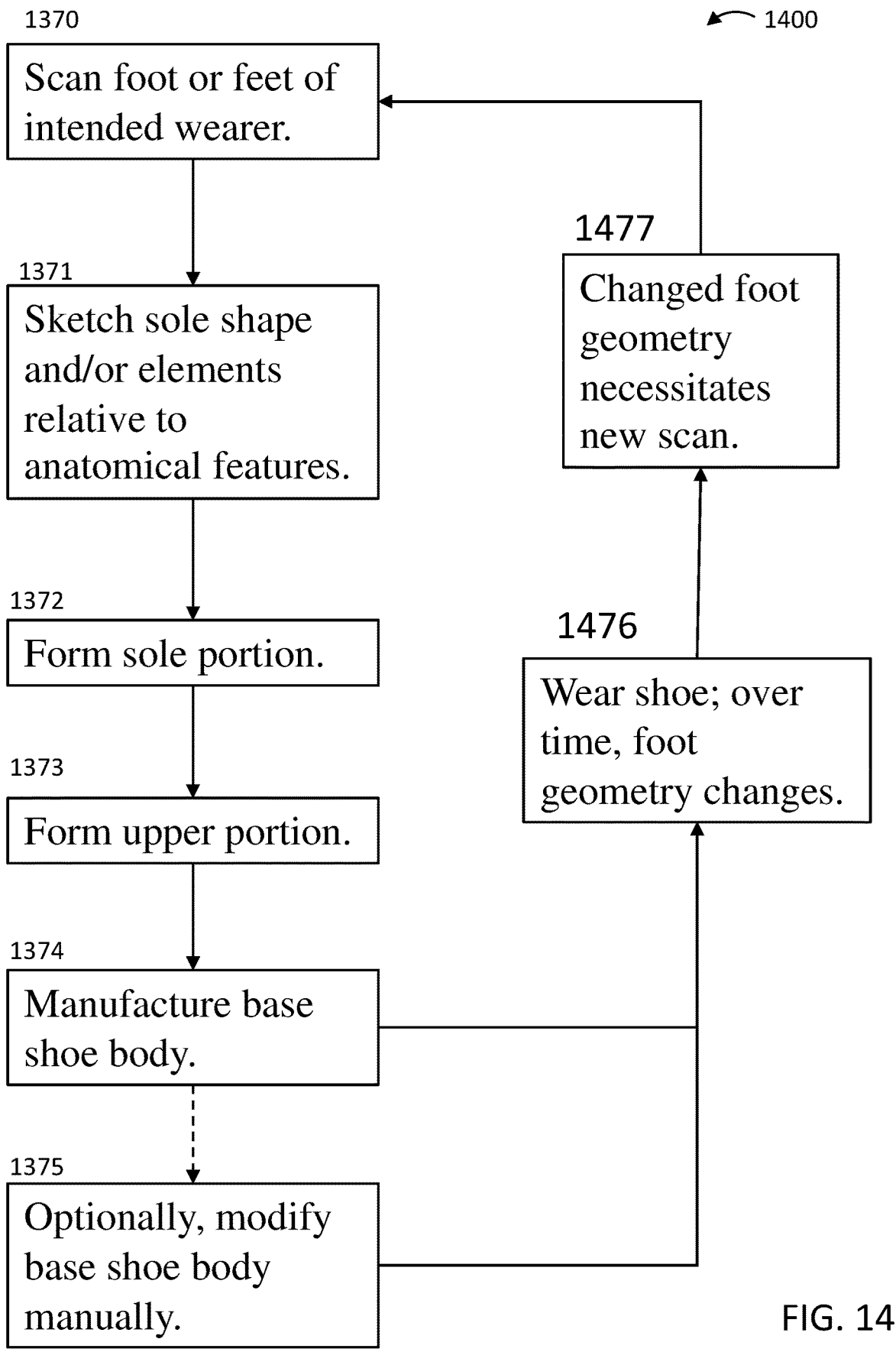
FIG. 14 depicts a process for custom-fitting a series of soles, shoes, or other footwear devices to the foot or feet of a unique individual in accordance with an aspect of this disclosure.

Reference is now made to FIG. 14 to describe a process 1400 for custom fitting a series of shoes or pairs of shoes to the foot or feet of a unique individual. The basis of the process is identical to that depicted by FIG. 13. The first step 1370 is to scan the foot or feet of the unique individual so as to produce a 2D or 3D representation of said foot or feet which may be characterized. The second step 1371 is to sketch a sole portion and any relevant constituent dimensions relative to the anatomy scanned and characterized in the first step 1370; of particular interest are the extensor longus tendons associated with the big toe and pinky toe. This step will be further qualified in FIGS. 15 and 16. The third step 1372 is to form a sole portion from the sketch made in step two 1371 by thickening said sketch profile to a uniform or near-uniform thickness, optionally incorporating any further desired sole elements in this base sole portion geometry. The fourth step 1373 is to form an upper portion by extruding as a thin hollow shell the sketch profile made in step two 1371 up to a superior upper profile in a shape which comfortably accommodates the whole foot when the shoe is ultimately worn by the target individual. The fifth step 1374 is to manufacture said base shoe body as a monolithic body using a flexible material; 3D printing is a good choice of manufacturing method for the fifth step 1374. The sixth step 1375, which may or may not be necessary depending on how prior steps are executed, is to modify the base shoe body manually; two relevant examples of this would be soldering an upper cavity covering to the top front lip of the base shoe body front portion using a soldering iron, and poking rows of lace holes in both the lateral and medial sides of the base shoe body using a soldering iron. If a shoe is desired for each foot, the base process 1300 may be repeated, beginning with either a new scanning step 1370 to scan the opposite foot, or by simply mirroring the existing scan during the sole sketching step 1371.

This particular process 1400 is as a feedback loop over the course of time. As the target individual wears the produced shoe, the baseline geometry of the individual's foot may shift slightly 1476, particularly regarding the shape of each toe and the overall width of the five-toe system. This may necessitate a new scan of the individual's foot or feet 1477; this cycle repeats until the foot or feet cease to shift in baseline geometry.

Figure 15:
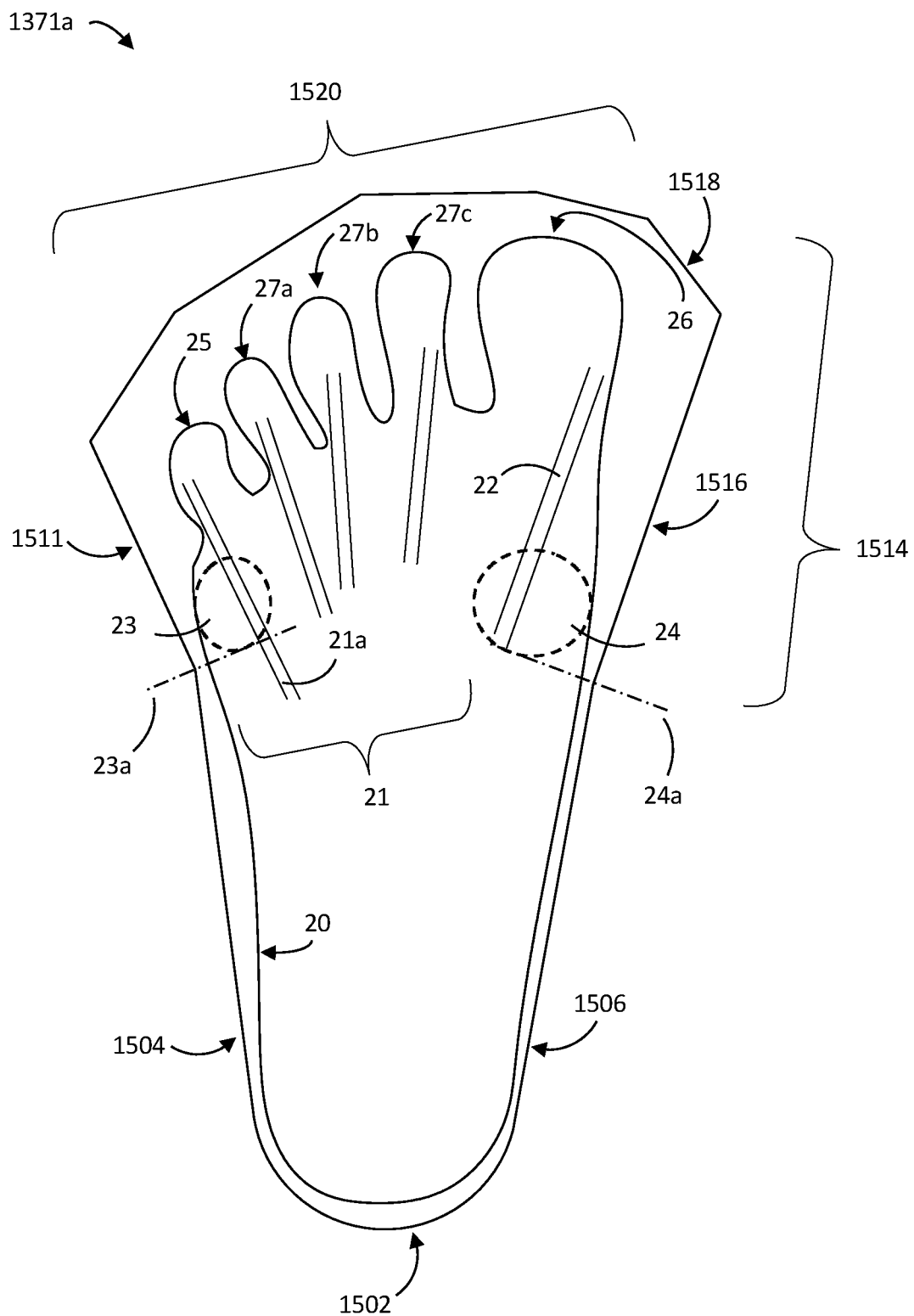
FIG. 15 depicts in further detail the second step of the process depicted by FIG. 13 or 14 in accordance with an aspect of this disclosure.

Reference is now made to FIG. 15 to describe the sole sketching step 1371a depicted by FIGS. 13 and 14 in more explicit detail. The scan 20 of the foot, in addition to its overall shape and size, features numerous characteristics of interest: the extensor digitorum longus tendons may bulge underneath the skin, forming a system of characteristic extensor digitorum longus references 21; the extensor hallucis longus tendon may also bulge underneath the skin, forming a characteristic hallucis longus tendon reference 22; the lateral-most metatarsophalangeal joint, or pinky toe knuckle, may be characterized when viewed aerially as a pinky toe knuckle reference oval 23; the medial-most metatarsophalangeal joint, or big toe knuckle, may be characterized when viewed aerially as a big toe knuckle reference oval 24. To form further reference boundaries, imaginary reference edges 23a, 24a may be characterized. The hind-most pinky toe knuckle reference edge 23a is formed from the line perpendicular to the pinky toe extensor digitorum longus tendon reference 21a which is tangent to the pinky toe knuckle reference oval 23 at its hind-most side. The hind-most big toe knuckle reference edge 24a is formed from the line perpendicular to the extensor hallucis longus tendon reference 22 which is tangent to the big toe knuckle reference oval 24 at its hind-most side. The outlines of all present toes 25,26,27a-c are visible.

To sketch the sole portion, all or some of this scanned and characterized base foot geometry may be referenced. The hind portion of the sole portion follows the geometry of the hindfoot portion of the foot scan 20. At the hindmost side is a heel curve 1502. A lateral hind portion edge 1504 extends from the lateral terminating point of the heel curve 1502 and terminates at the hind-most pinky toe knuckle reference edge 23a. A medial hind portion edge 1506 extends from the medial terminating point of the heel curve 1502 and terminates at the hind-most big toe knuckle reference edge 24a. At the forefoot portion, a lateral forefoot edge 1511 parallel to the pinky toe extensor digitorum longus reference 21a extends from the hind-most pinky toe knuckle reference edge 23a to terminate beyond the distal apex of the pinky toe 25; a medial forefoot portion 1514 comprises a hind-most medial forefoot edge 1516 parallel to the extensor hallucis longus tendon reference 22 which extends from the hind-most big toe knuckle reference edge 24a to terminate near the distal apex of the big toe 26, and a foremost medial forefoot edge 1518 which accommodates the remainder of the big toe 26 distal phalanx; and a front portion 1520 which connects the foremost terminating point of the lateral forefoot edge 1511 to the foremost terminating point of the medial forefoot portion 1514 as an arc of discrete edges which when taken as a whole is beyond the foremost distal reaches of all five toes 25,26,27*a-c*.

Figure 16:
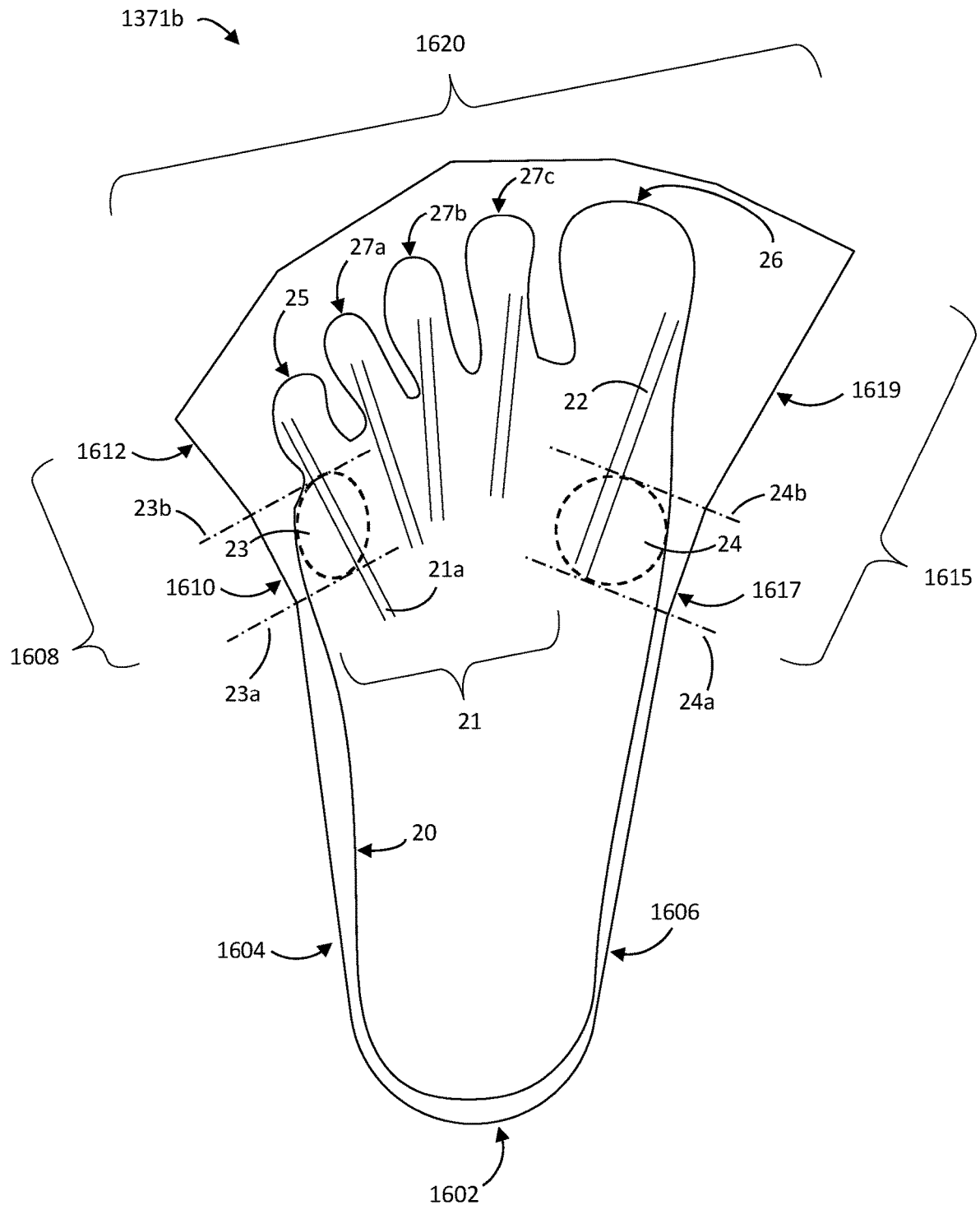
FIG. 16 depicts in further detail another embodiment of the second step of the process depicted by FIG. 13 or 14 in accordance with an aspect of this disclosure.

Reference is now made to FIG. 16 to describe an alternate embodiment of the sole sketching step 1371*b* depicted by FIGS. 13 and 14 in more explicit detail. The scan 20 of the foot, in addition to its overall shape and size, features numerous characteristics of interest: the extensor digitorum longus tendons may bulge underneath the skin, forming a system of characteristic extensor digitorum longus references 21; the extensor hallucis longus tendon may also bulge underneath the skin, forming a characteristic hallucis longus tendon reference; the lateral-most metatarsophalangeal joint, or pinky toe knuckle, may be characterized when viewed aerially as a pinky toe knuckle reference oval 23; the medial-most metatarsophalangeal joint, or big toe knuckle, may be characterized when viewed aerially as a big toe knuckle reference oval 24. To form further reference boundaries, imaginary reference edges 23*a-b*, 24*a-b* may be characterized. The hind-most pinky toe knuckle reference edge 23*a* is formed from the line perpendicular to the pinky toe extensor digitorum longus tendon reference 21*a* which is tangent to the pinky toe knuckle reference oval 23 at its hind-most side. The foremost pinky toe knuckle reference edge 23*b* is formed from the line perpendicular to the pinky toe extensor digitorum longus tendon reference 21*a* which is tangent to the pinky toe knuckle reference oval 23 at its foremost side. The hind-most big toe knuckle reference edge 24*a* is formed from the line perpendicular to the extensor hallucis longus tendon reference 22 which is tangent to the big toe knuckle reference oval 24 at its hind-most side. The foremost big toe knuckle reference edge 24*b* is formed from the line perpendicular to the extensor hallucis longus tendon reference 22 which is tangent to the big toe knuckle reference oval 24 at its foremost side. The outlines of all present toes 25,26,27*a-c* are visible. To sketch the sole portion, all or some of this scanned and characterized base foot geometry may be referenced.

The hind portion of the sole portion follows the geometry of the hindfoot portion of the foot scan 20. At the hindmost side is a heel curve 1602. A lateral hind portion edge 1604 extends from the lateral terminating point of the heel curve 1602 and terminates at the hind-most pinky toe knuckle reference edge 23*a*. A medial hind portion edge 1606 extends from the medial terminating point of the heel curve 1602 and terminates at the hind-most big toe knuckle reference edge 24*a*. The forefoot portion comprises a lateral forefoot portion 1608 intended to accommodate the full range of motion of the pinky toe 25 of the wearer, a medial forefoot portion 1614 intended to accommodate the full range of motion of the big toe 26 of the wearer, and a front portion 120.

At the lateral forefoot portion 1608, a hindmost lateral forefoot edge 1610 extends from the hind-most pinky toe knuckle reference edge 23*a* to the fore-most pinky toe knuckle reference edge 23*b* in a straight line parallel to the pinky toe extensor digitorum longus reference 21*a*. A foremost lateral forefoot edge 1612 then extends from the foremost terminating point of the hindmost lateral forefoot edge 1610 to terminate beyond the distal apex of the pinky toe 25 in a line flared laterally relative to the hindmost lateral forefoot edge 1610 and the pinky toe extensor digitorum longus reference 21*a*. At the medial forefoot portion 1615, a hindmost medial forefoot edge 1617 extends from the hind-most big toe knuckle reference edge 24*a* to the foremost big toe knuckle reference edge 24*b* in a straight line parallel to the extensor hallucis longus reference 22. A foremost medial forefoot edge 1619 then extends from the foremost terminating point of the hindmost lateral forefoot edge 1617 to terminate beyond the distal apex of the big toe 26 in a line flared medially relative to the hindmost lateral forefoot edge 1617 and the extensor hallucis longus reference 22.

A front portion 1620 connects the foremost terminating point of the lateral forefoot portion 1608 to the foremost terminating point of the medial forefoot portion 1615 as an arc of discrete edges which when taken as a whole is beyond the foremost distal reaches of all five toes 25,26,27*a-c*.

Figure 17A:
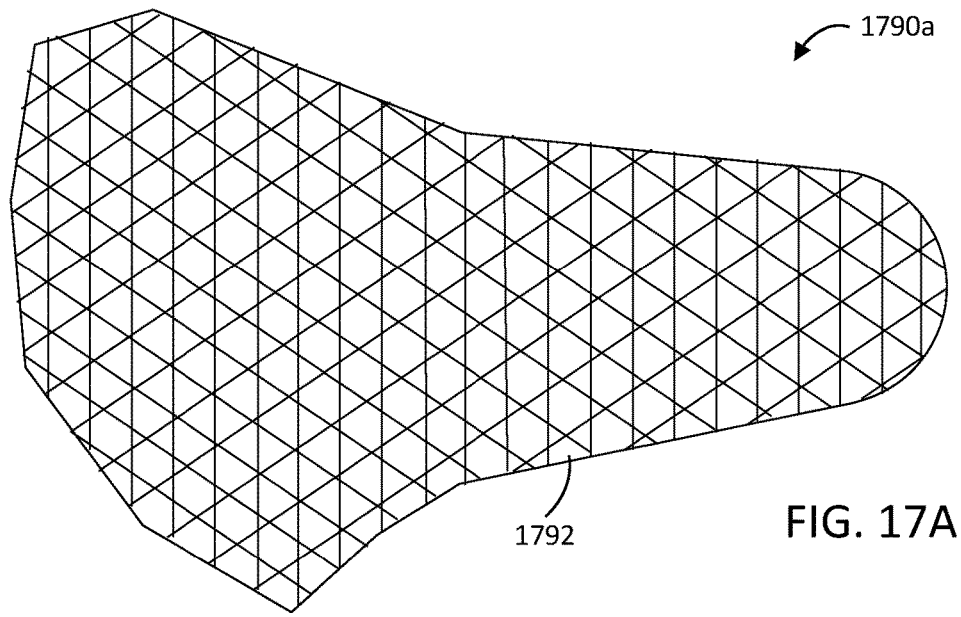
FIGS. 17A-D depict a sole for a shoe or other footwear device comprising a lattice structure which enables two-dimensional and three-dimensional bending, twisting, and curling, in accordance with an aspect of this disclosure.
Figure 17B:
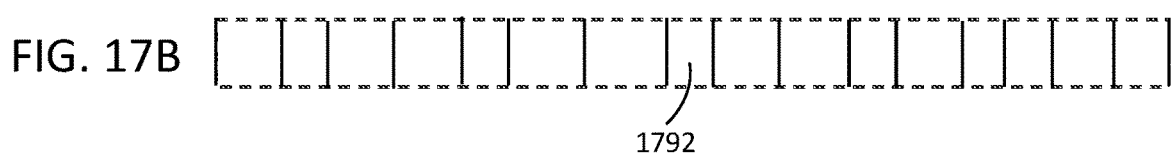
Figure 17C:
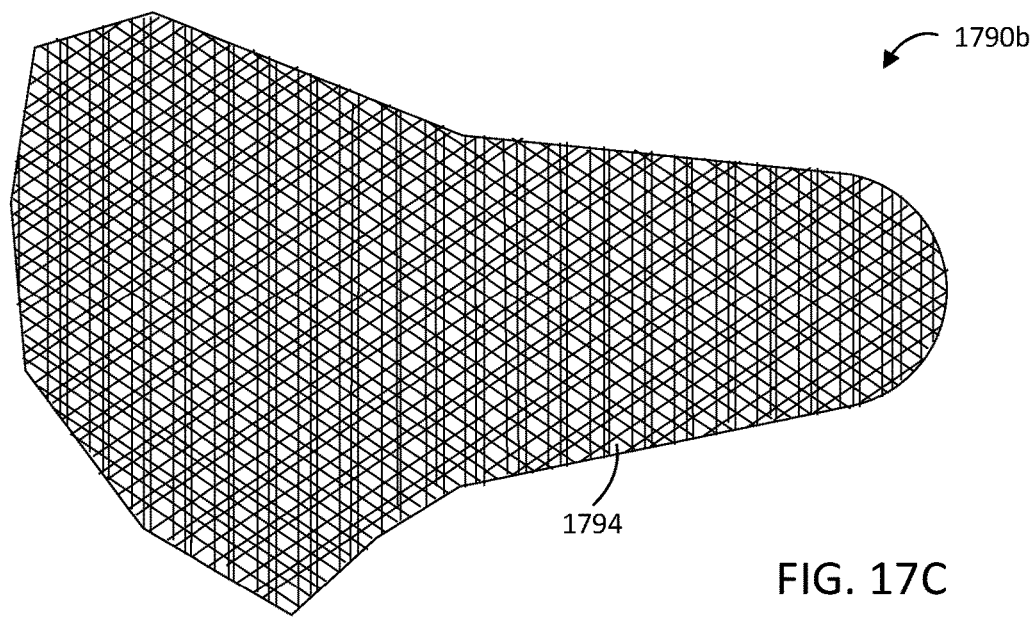
Figure 17D:
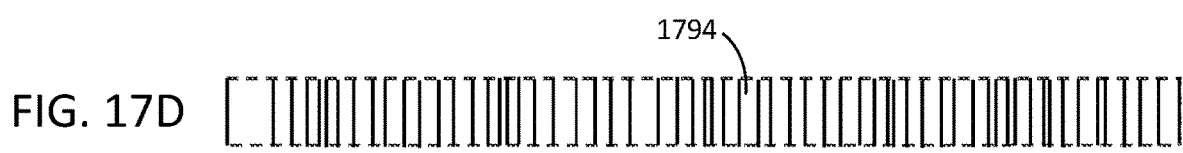

Reference is now made to FIGS. 17A-D to describe a lattice structure for a sole 1790*a, b* for a shoe or other footwear device. As depicted in FIGS. 17A-B, a material suitable for a sole 1790*a* for a shoe or other footwear device may be made to form a sparse pattern of thin lines at 60 degree angles with each other 1792 in the shape of said sole 1790*a*; alternatively, as depicted in FIGS. 17C-D, said sole 1790*b* may be formed from said material as a dense pattern of thin lines at 60 degree angles with each other 1794. When layers of said thin lines 1792,1794 are stacked directly atop one another, as depicted by FIGS. 17B,D, whether by the chosen manufacturing method or otherwise, the resulting structure comprises an all-encompassing array of substantial holes through which air, moisture, and the like may flow. When layers of said thin lines 1792, 1794 are formed from a sufficiently flexible material relative to the density of said lines and resultant geometric shapes, the sole is further imbued with the ability to bend, curl, and twist through 3D space.

Furthermore, when a sufficiently flexible material is utilized to form said walls, the ability to bend, curl, and twist through 3D space may be conferred by virtue of stacking said thin lines 1792, 1794 atop one another to form slanted walls, constituting an overall cubic 3D lattice structure; this design may further confer desirable compressive resistance to the downward force applied by the foot in the process of producing motion.

The invention claimed is:

1. A sole for footwear for a foot, having a centerline, comprising:
  a hindfoot portion beginning at a hindmost surface of a heel and concluding at a foremost surface of the heel;
  a midfoot portion coupled to the hindfoot portion, the midfoot portion beginning at a foremost surface of the hindfoot portion and configured to conclude before metatarsal heads of the foot, the midfoot portion including first lateral and first medial edges flared away from the centerline at first and second angles;
  a forefoot portion coupled to the midfoot portion, the forefoot portion configured to begin before metatarsal heads of the foot and conclude in a foremost surface beyond distal apexes of phalanges of the foot;
  the forefoot portion including a second lateral edge flared away from the centerline at a third angle which is larger than the first angle, the forefoot portion further including a second medial edge flared away from the centerline at a fourth angle which is larger than the second angle;
  wherein the second lateral edge of the forefoot portion is configured to terminate distally beyond a distal apex of a fifth phalange of the foot, when the fifth phalange is articulated to maximum lateral position, and the second medial edge of the forefoot portion is configured to terminate distally beyond a distal apex of a first phalange of the foot, when the first phalange is articulated to maximum medial position, and wherein the second lateral edge and second medial edge are single straight edges increasing in distance from the centerline from a proximal end to a distal end.

2. The sole for footwear, according to claim 1, further comprising a third lateral edge flared away from the centerline at a fifth angle larger than the second angle.

3. The sole for footwear, according to claim 1, further comprising a third medial edge flared toward the centerline at a sixth angle which is smaller than the second angle.

4. The sole for footwear for a foot, according to claim 1 comprising, a spherical protuberance having an apex, the spherical protuberance having a characteristic width greater than a hindmost width of the forefoot portion;
the spherical protuberance configured to be centered under a metatarsal head of an index toe of the foot; the spherical protuberance having a foremost convex crescent shelf intersecting the centerline further distally than the apex of the spherical protuberance; the spherical protuberance having a hind-most concave crescent shelf intersecting the centerline further proximally than the apex of the spherical protuberance.

5. The sole for footwear, according to claim 4, the spherical protuberance having a characteristic center located adjacent to an inferior face of the sole, the spherical protuberance therefore having a characteristic radius greater than half of the hindmost width of the forefoot portion.

6. A shoe for a foot, having a centerline, comprising;
a hindfoot portion beginning at a hindmost surface of a heel and concluding at a foremost surface of the heel;
a midfoot portion coupled to the hindfoot portion, the midfoot portion beginning at a foremost surface of the hindfoot portion and configured to conclude before metatarsal heads of the foot, the midfoot portion including first lateral and first medial edges flared away from the centerline at first and second angles;
a forefoot portion coupled to the midfoot portion, the forefoot portion configured to begin before metatarsal heads of the foot and conclude in a foremost surface beyond distal apexes of phalanges of the foot; the forefoot portion including a second lateral edge flared away from the centerline at a third angle which is larger than the first angle,
the forefoot portion further including a second medial edge flared away from the centerline at a fourth angle which is larger than the second angle; wherein the second lateral edge of the forefoot portion is configured to terminate distally beyond a distal apex of a fifth phalange of the foot, when the fifth phalange is articulated to maximum lateral position, and the second medial edge of the forefoot portion is configured to terminate distally beyond a distal apex of a first phalange of the foot, when the first phalange is articulated to maximum medial position;
wherein the second lateral edge and second medial edge are single straight edges increasing in distance from the centerline from a proximal end to a distal end
and an upper coupled to the sole.

7. The shoe, according to claim 6, further comprising a third lateral edge flared away from the centerline at a fifth angle larger than the second angle.

8. The shoe, according to claim 6, further comprising a third medial edge flared toward the centerline at a sixth angle which is smaller than the second angle.

9. The shoe, according to claim 6 wherein the upper comprises a midfoot upper portion.

10. The shoe, according to claim 6 wherein the upper comprises a forefoot upper portion.

11. The shoe, according to claim 6 wherein the upper comprises a hindfoot upper portion.

12. The shoe, according to claim 6, further comprising a spherical protuberance having an apex, the spherical protuberance having a characteristic width greater than a hindmost width of the forefoot portion; the spherical protuberance configured to be centered under a metatarsal head of an index toe of the foot; the spherical protuberance having a foremost convex crescent shelf intersecting the centerline further distally than the apex of the spherical protuberance; the spherical protuberance having a hind-most concave shelf intersecting the centerline further proximally than the apex of the spherical protuberance.

13. The shoe, according to claim 12, the spherical protuberance having a characteristic center located adjacent to an inferior face of the sole, the spherical protuberance therefore having a characteristic radius greater than half of the hindmost width of the forefoot portion.

14. The shoe, according to claim 6, being formed as a single monolithic body comprising a flexible material.

15. The shoe, according to claim 6, being formed as a single monolithic body comprising a rigid material.

\* \* \* \* \*